May 15, 1945.  W. C. CHILDRESS ET AL  2,375,769
STRAP STRETCHING AND SEALING APPARATUS
Filed Dec. 21, 1939   11 Sheets-Sheet 9
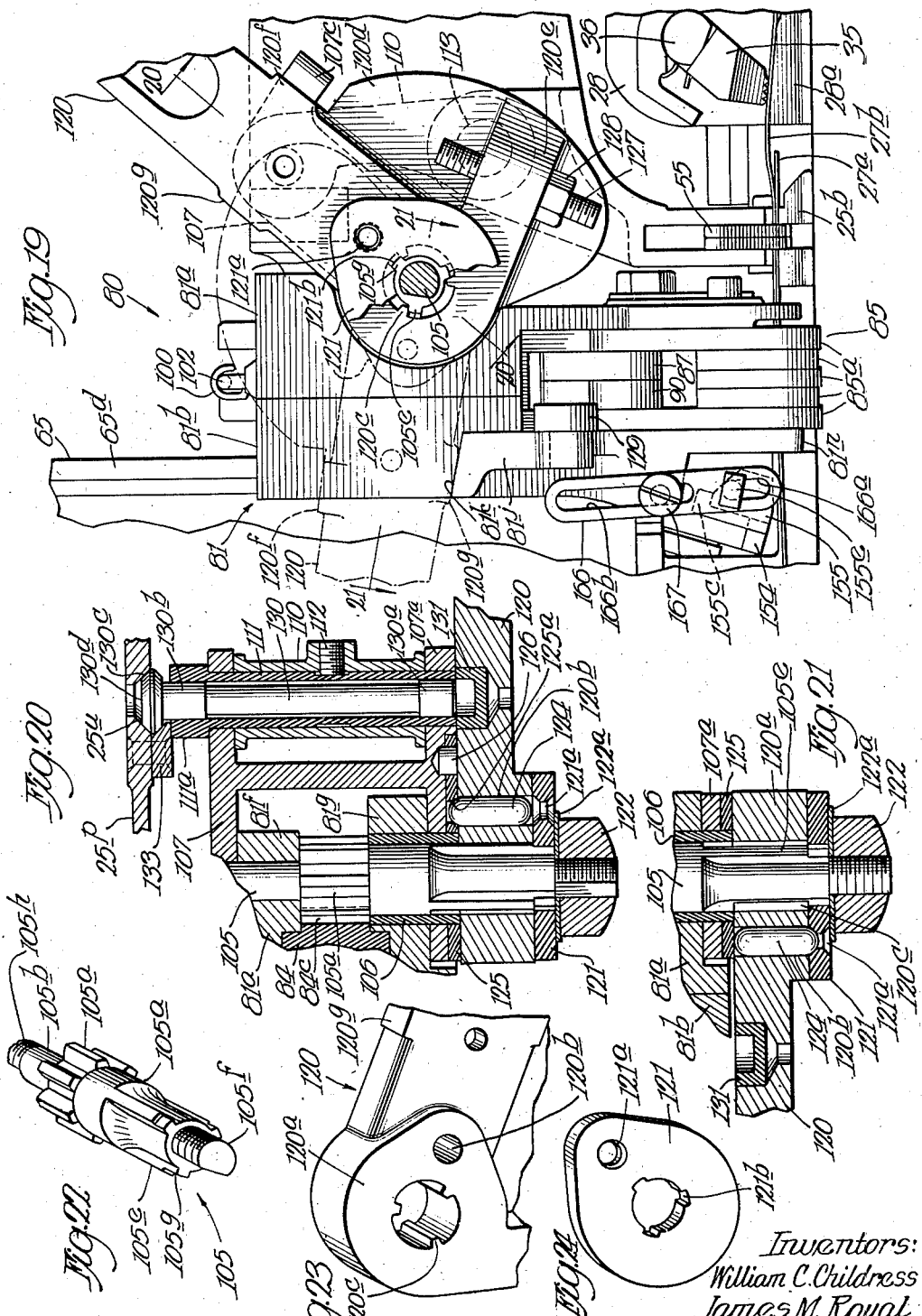
Inventors:
William C. Childress
James M. Royal
By Davis, Lindsey, Smith & Shonts, Attys

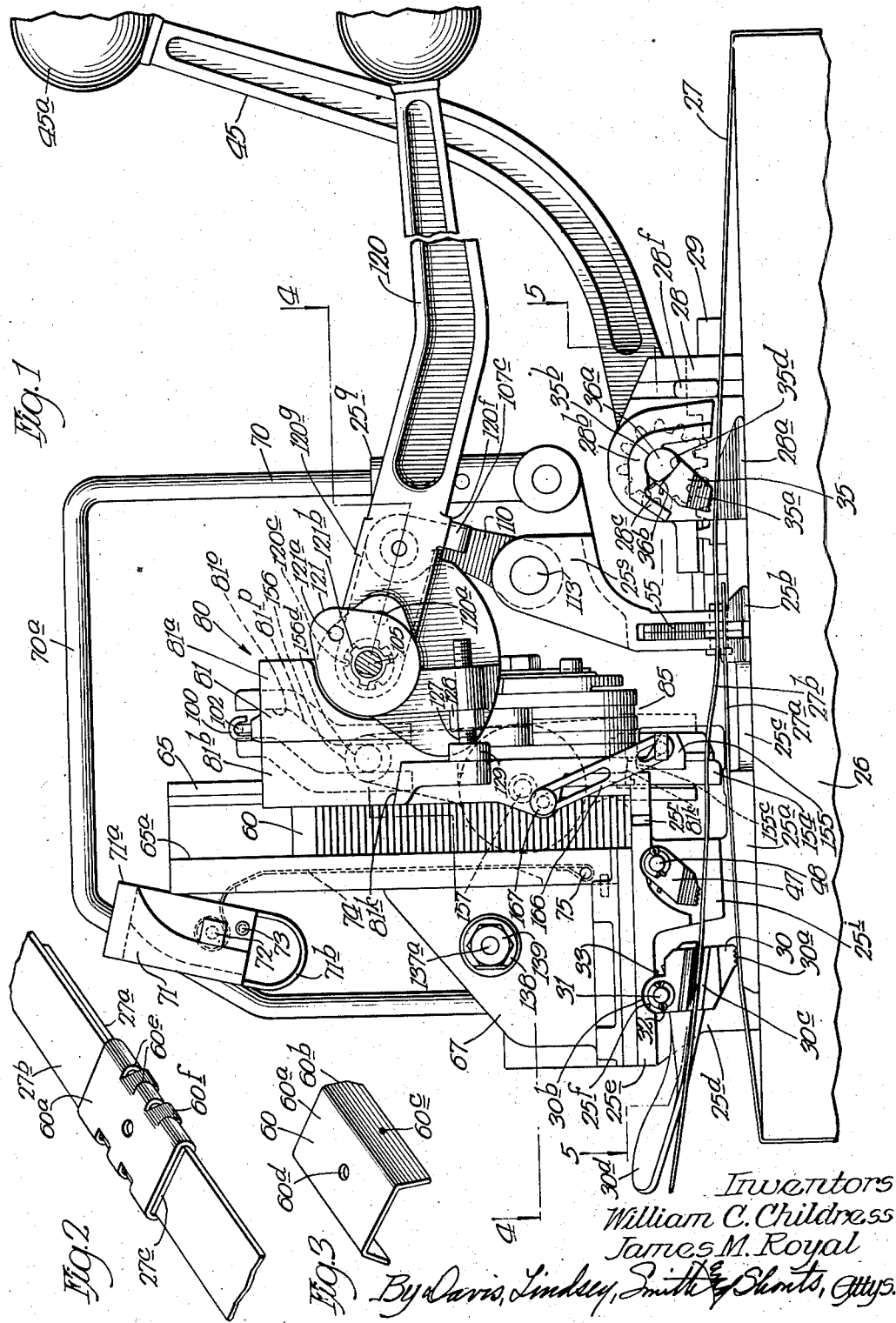

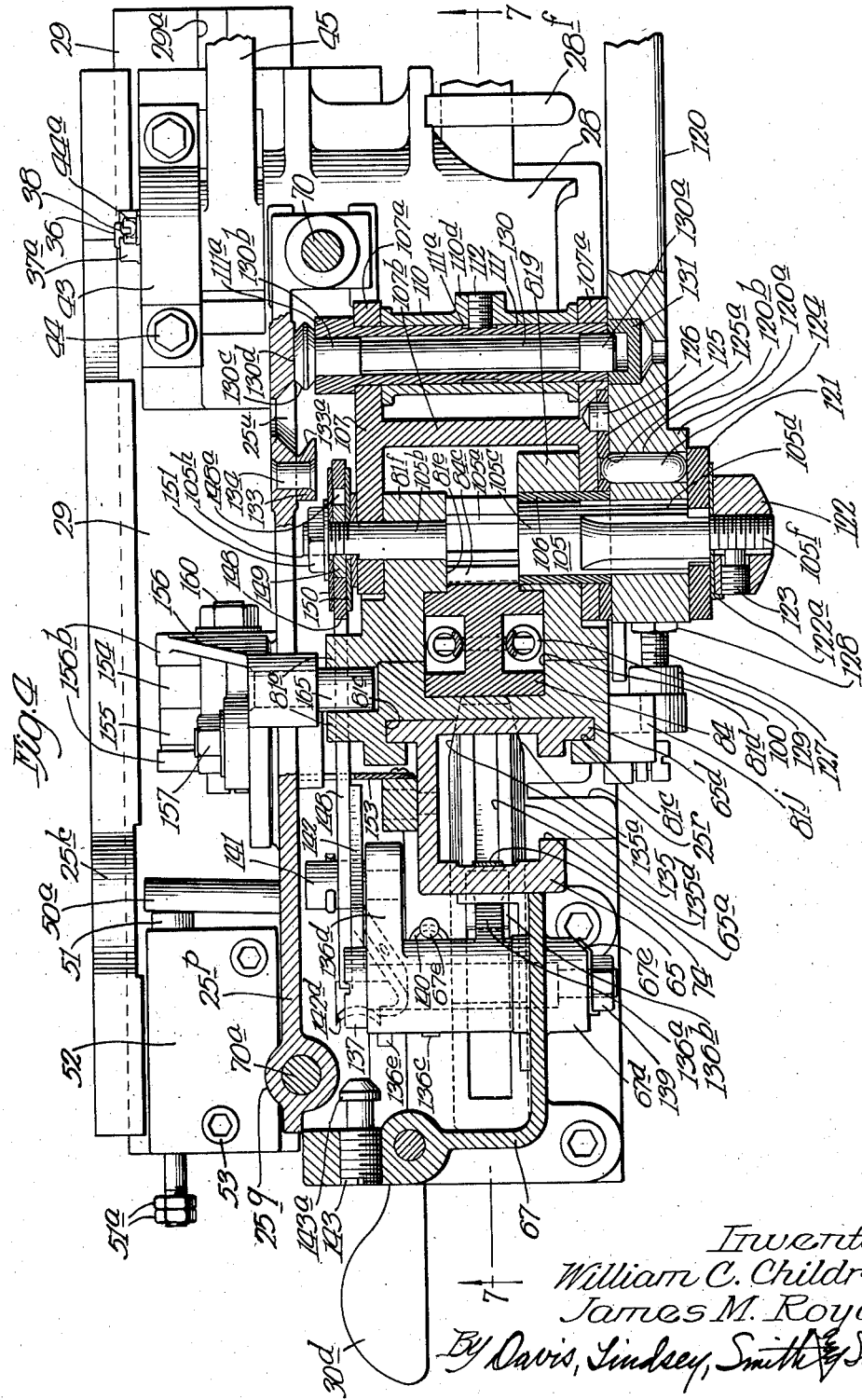

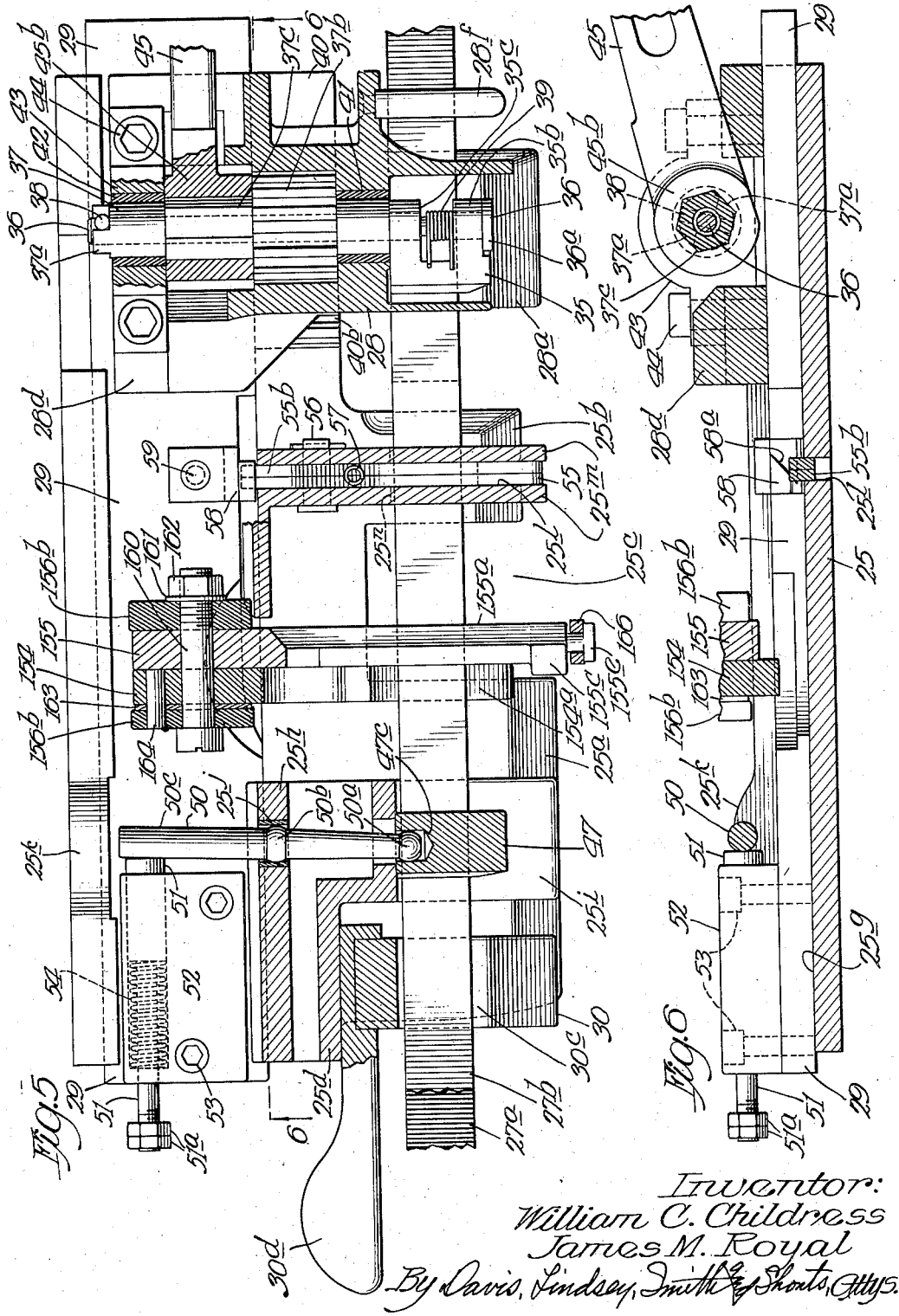

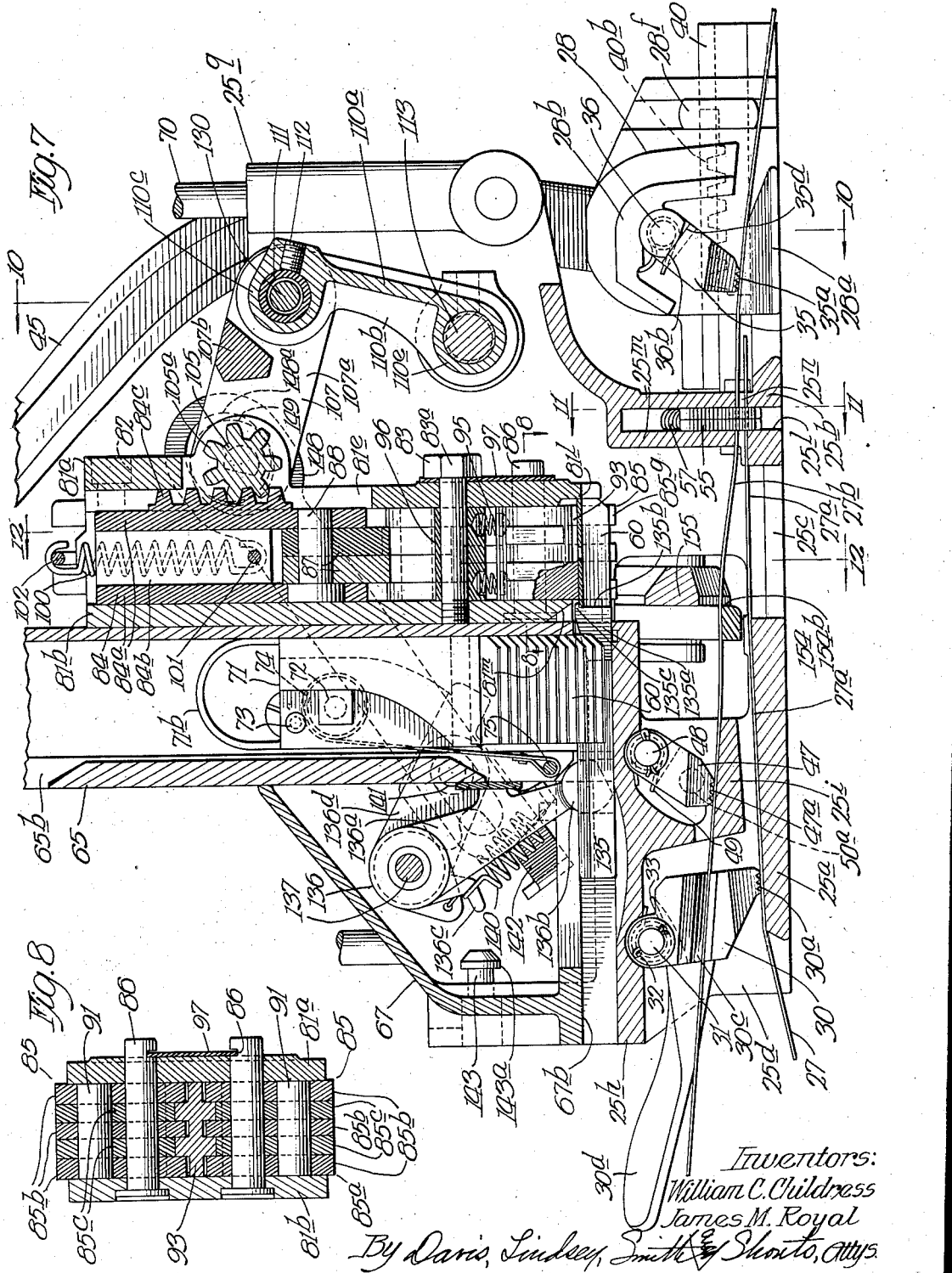

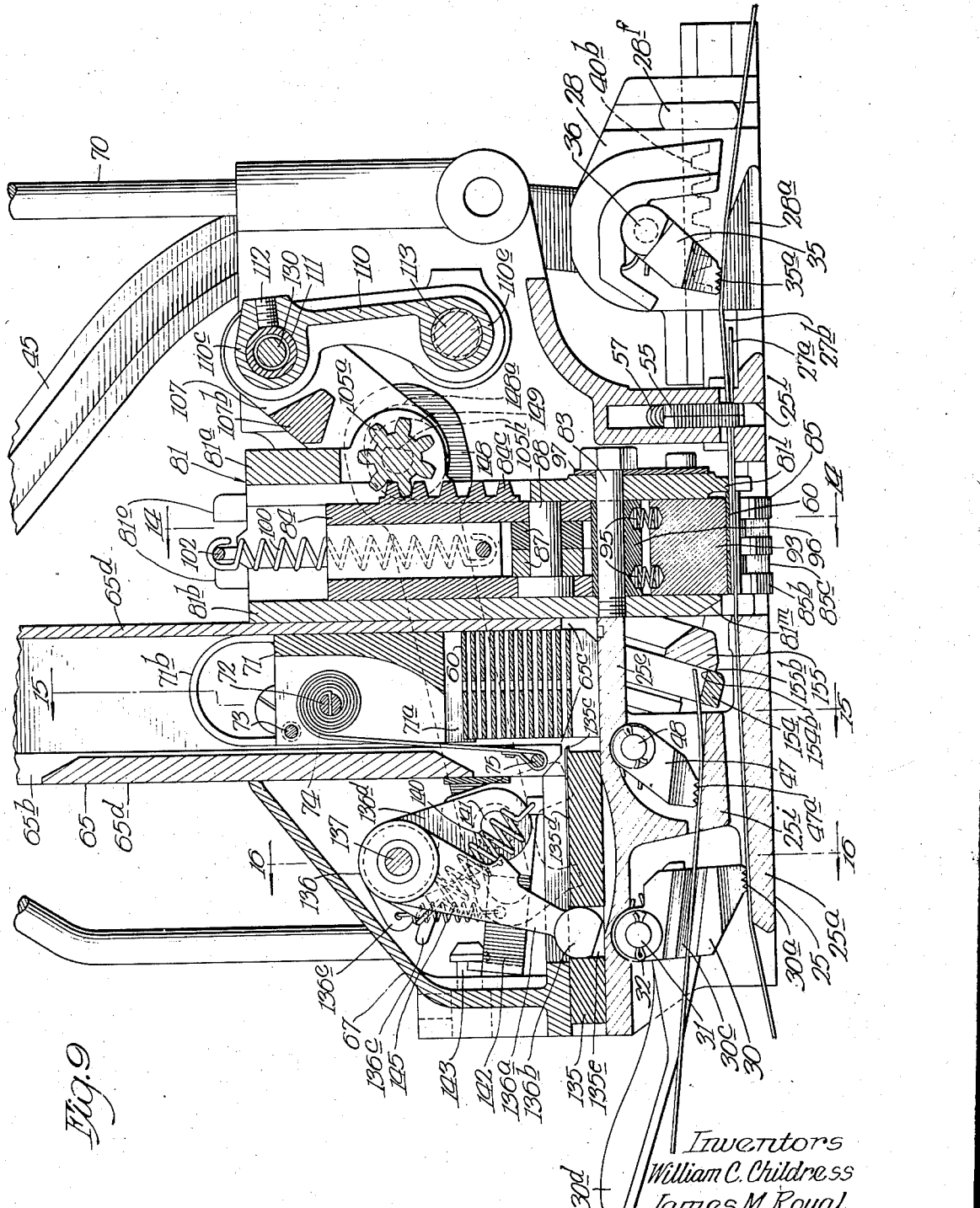

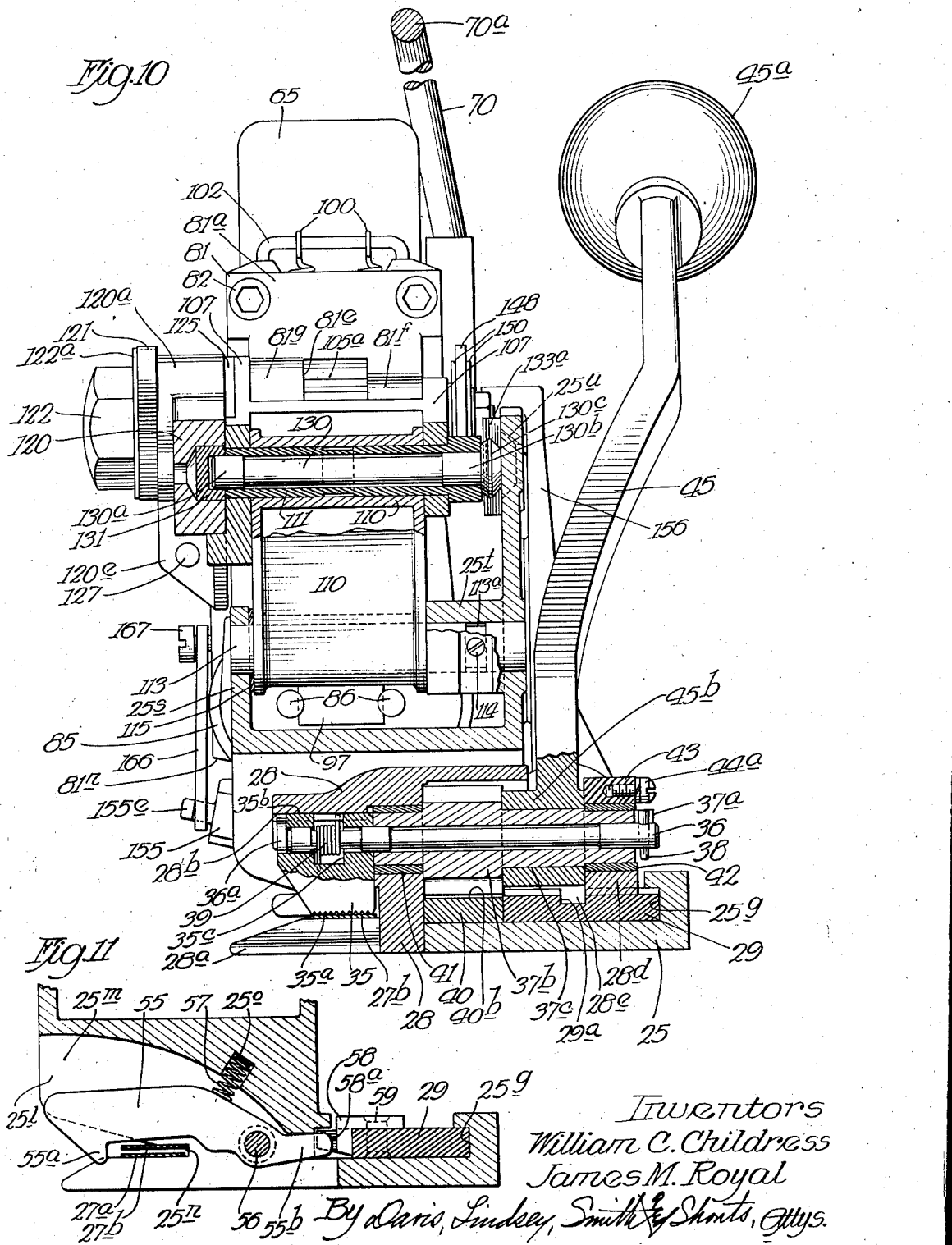

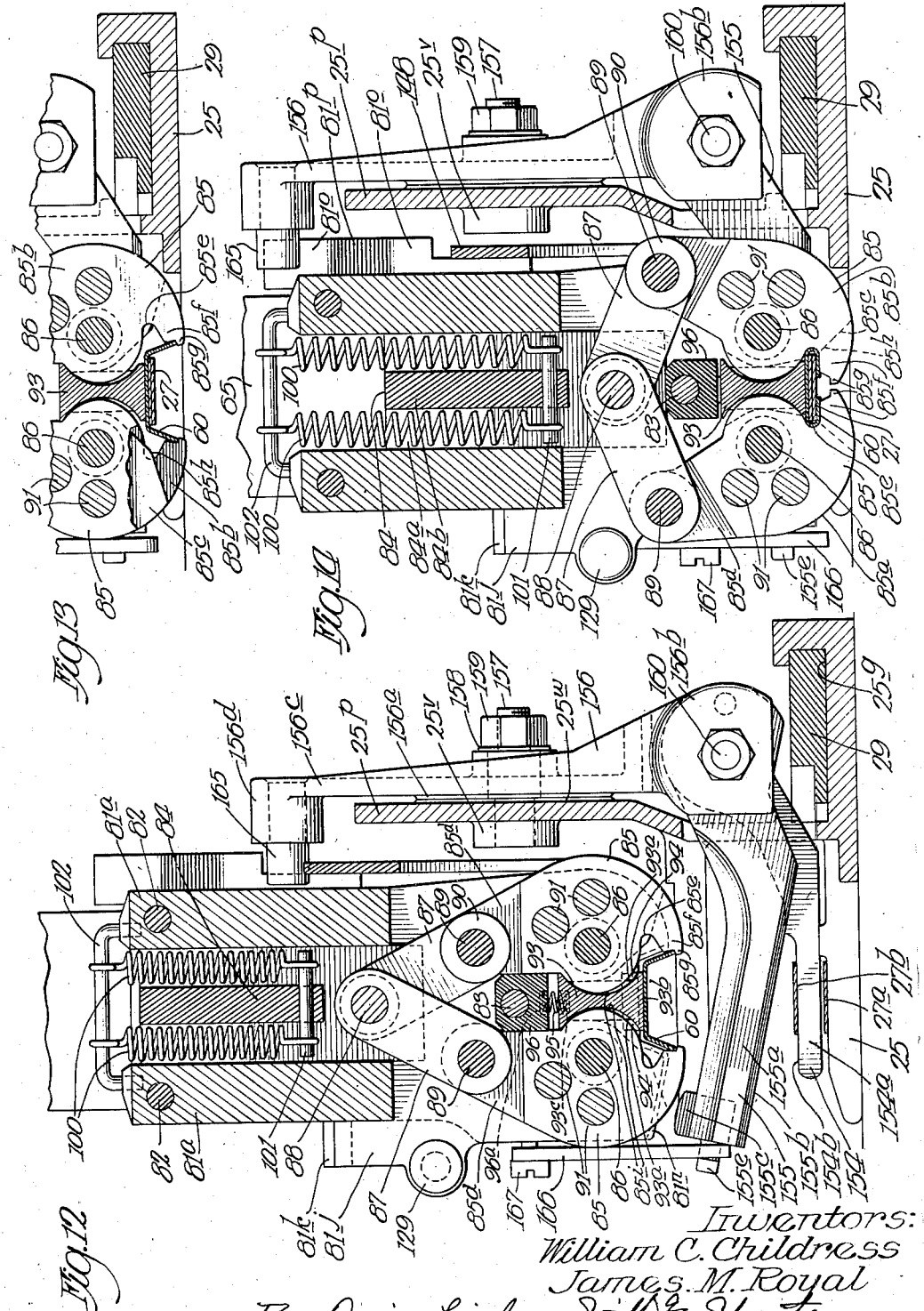

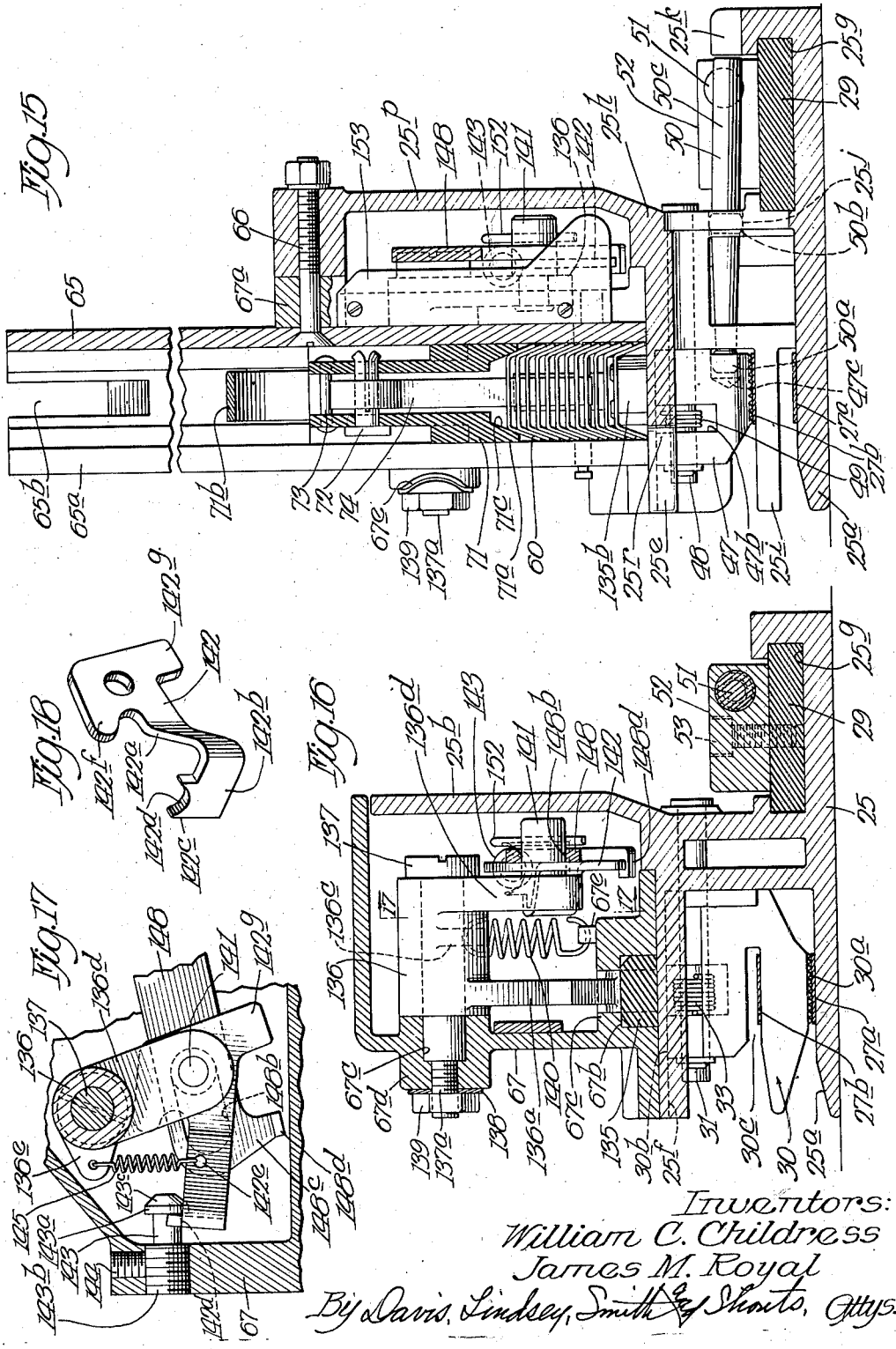

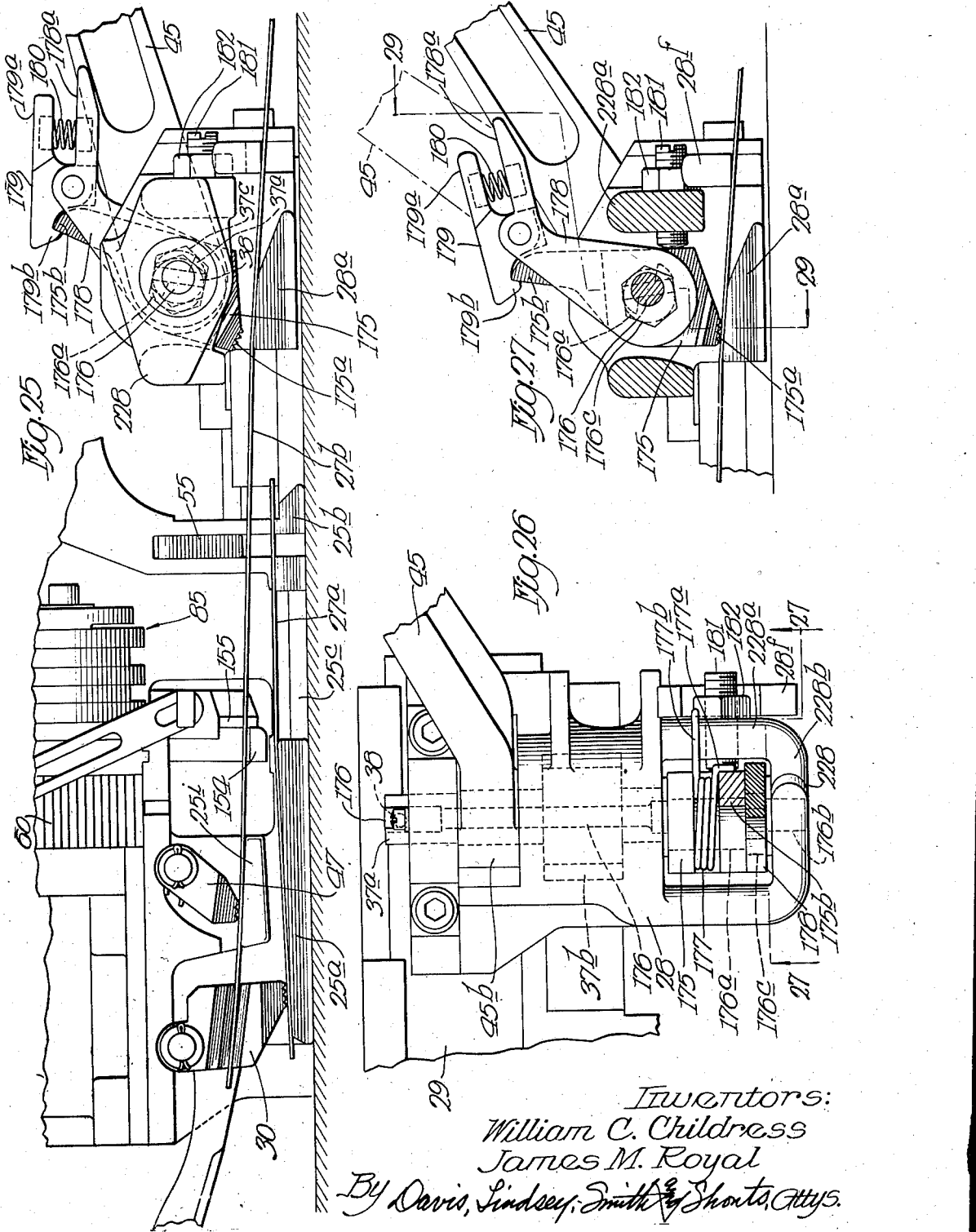

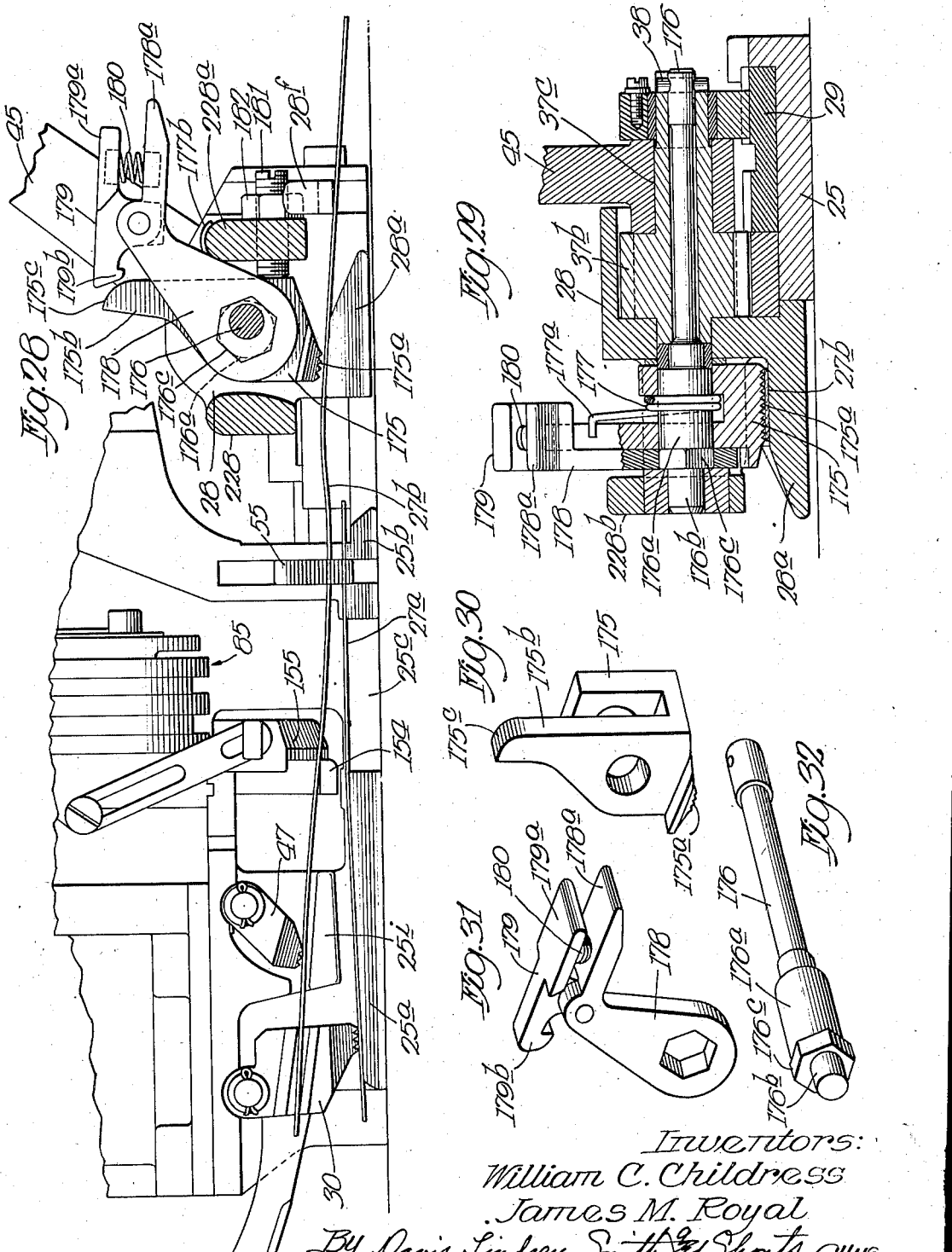

Patented May 15, 1945

2,375,769

UNITED STATES PATENT OFFICE 2,375,769

STRAP STRETCHING AND SEALING APPARATUS

William C. Childress, Oak Park, and James M. Royal, Villa Park, Ill., assignors to Acme Steel Company, Chicago, Ill., a corporation of Illinois Application December 21, 1939, Serial No. 310,276

31 Claims. (Cl. 81—9.1)

This invention relates to improvements in strap stretching and sealing apparatus, and its purpose is to provide improved means by which a flexible binder, such as a flat or substantially flat flexible steel strap, including strap having a concaved cross section, may be drawn taut around a box or package, or about a group of such objects, and its overlapping ends then united by means of a seal or the like. The present invention is an improvement upon those described and claimed in United States Patents Nos. 2,097,443, 2,097,444, 2,097,945, 2,097,955 and 2,097,980 all granted on November 2, 1937.

In general, the prior patents referred to disclose strap stretching and sealing apparatus in which opposite end portions of a strap passed around a package are held by relatively movable gripping devices carried by the base plate of the apparatus, which is adapted to seat upon the package, these gripping devices being capable of being moved toward each other by the operation of a lever, after which a second lever is operated to move a seal into engagement with the overlapping strap ends and then to deform the strap ends and seal to provide an interlocking joint. The seals are supplied to the sealing head from a storage magazine, being automatically fed therefrom during the stretching operation, and the sealing lever is so mounted on the head that its initial movement cuts off the strap from the source of supply and moves the head to position the seal on the overlapping strap ends, while the succeeding pivotal motion of the lever with respect to the head deforms the strap and seal to provide an interlocking joint.

The present invention has for its principal object to provide improved apparatus of the type referred to which may be more conveniently and efficiently operated and which is stronger and more durable, so that it may be used with particular advantage for uniting the ends of strap of heavy gauges, although not limited to such use. A further object is to provide strap sealing apparatus comprising improved means for cutting off the strap from the source of supply, after it has been drawn taut, in such a manner that the resulting strap end is located close to the seal so that there is no projecting strap end on the outer side of the box or package. Another object is to provide improved strap sealing apparatus comprising a movable sealing head adapted to apply a seal to the overlapping strap ends in combination with means for cutting off the strap from the source of supply, the cutting means being located in the path of movement of the head during the cutting operation but being automatically movable from that path as the head approaches the strap ends. A still further object is to provide strap sealing apparatus comprising a head movable toward and from the strap ends and actuated by a lever having improved controlling means for causing the initial movement of the lever to move the head to place a seal on the strap ends and for causing the final movement of the lever to actuate sealing jaws within the head. Another object is to provide strap sealing apparatus comprising a head movable toward and from overlapping strap ends and embodying relatively movable jaws adapted to receive between them, when the head is removed from the strap ends, a seal which is moved from a seal storage magazine by improved feeding means. A further object is to provide strap sealing apparatus comprising improved stretching mechanism for drawing a strap taut around a box or package, this stretching mechanism comprising relatively movable gripping devices and actuating mechanism for moving these gripping dogs to draw the strap taut in combination with an additional gripping device adapted to hold the supply portion of the strap between successive operations of the actuating mechanism so that the strap may be drawn taut in successive increments without releasing the strap between successive operations of the actuating mechanism. Another object is to provide improved strap stretching mechanism adapted to draw a strap taut around a package and comprising two relatively movable gripping dogs for holding the strap during the stretching operation and also a third gripping dog for holding the supply end of the strap between successive operations of the stretching mechanism, said stretching mechanism embodying a lever which is connected to release two of said gripping devices from the strap when it is moved to a predetermined position. Another object is to provide strap sealing apparatus comprising a base plate adapted to seat upon the surface of a box or package, said base plate having parts over which the opposite end portions of the strap are adapted to extend in combination with gripping devices mounted over the base plate for cooperating therewith to hold said portions of the strap and a retaining member adapted to prevent the removal of the strap ends laterally from their positions beneath the gripping dogs, said retaining member and at least one of said gripping dogs being automatically removed to inoperative positions by a predetermined operation of mechanism which is provided for effecting relative movement of the gripping dogs for the purpose of drawing the strap taut. Still another object is to provide strap stretching apparatus comprising improved means for mounting and actuating relatively movable gripping dogs by which the opposite end portions of a strap are held. Other objects relate to various features of construction and arrangement which will appear more fully hereinafter.

The nature of the invention will be understood from the following specification taken with the accompanying drawings in which one embodiment is illustrated. In the drawings, Figure 1 shows a front elevation of one form of strap stretching and sealing apparatus embodying the present invention, the apparatus being shown positioned upon the upper surface of a box or package about which a flat flexible metallic binder has been passed;

Fig. 2 is a perspective view of overlapping strap ends which are united by one form of interlocking joint adapted to be formed by the apparatus illustrated in Fig. 1, illustrating the upper end of the strap as being cut off in proximity to one end of the seal;

Fig. 3 is a perspective view of one form of channel-shaped metal seal adapted to be used with the apparatus illustrated in Fig. 1;

Fig. 4 shows an irregular horizontal section taken on the line 4—4 of Fig. 1;

Fig. 5 shows an irregular horizontal section taken on the line 5—5 of Fig. 1;

Fig. 6 shows a partial vertical section taken on the line 6—6 of Fig. 5;

Fig. 7 shows an enlarged vertical section on the line 7—7 of Fig. 4 illustrating the sealing head in its extreme elevated position in which it is adapted to receive a seal from the lower end of the magazine;

Fig. 8 shows an enlarged horizontal section through the sealing jaws on the line 8—8 of Fig. 7;

Fig. 9 is an enlarged vertical section similar to that of Fig. 7 showing the relative positions of the parts when the sealing lever has been actuated to lower the sealing head and to actuate the jaws to form an interlocking joint of the type shown in Fig. 2;

Fig. 10 shows a vertical section on the line 10—10 of Fig. 7;

Fig. 11 shows a vertical section on the line 11—11 of Fig. 7, illustrating the retaining member for holding the strap ends over the base plate during the stretching operation;

Fig. 12 shows a vertical section on the line 12—12 of Fig. 7, illustrating the sealing jaws and the movable cutting blade in their elevated positions;

Fig. 13 is a partial sectional view, similar to that of Fig. 12, showing the relative positions of the parts after the sealing head has been lowered to cause a seal held between the jaws to engage the overlapping strap ends;

Fig. 14 is a vertical section taken on the line 14—14 of Fig. 9, showing the relative positions of the parts illustrated in Fig. 12, after the sealing head has been lowered and the jaws have been actuated to form an interlocking joint.

Fig. 15 shows a vertical section on the line 15—15 of Fig. 9;

Fig. 16 shows a vertical section on the line 16—16 of Fig. 9;

Fig. 17 shows a vertical section on the line 17—17 of Fig. 16;

Fig. 18 is a perspective view of the latch member illustrated in Figs. 9, 16 and 17, by which the seal feeding means is restrained from operating until the sealing head reaches its extreme upper position;

Fig. 19 is a partial enlarged front elevation of the apparatus illustrated in Fig. 1, with parts thereof broken away, showing by full lines the position of the sealing lever and associated parts after the sealing head has been lowered and before the jaws have been actuated to form an interlocking joint, and showing by dotted lines the relative positions of the sealing lever and associated parts after this lever has been operated to actuate the sealing jaws for the purpose of deforming the strap ends and the seal;

Fig. 20 shows a detail section taken on the line 20—20 of Fig. 19;

Fig. 21 shows a detail section taken on the line 21—21 of Fig. 19;

Fig. 22 shows a perspective view of the toothed pin on which the sealing lever is mounted;

Fig. 23 is a perspective view of the bearing member engaged by one end of the pin illustrated in Fig. 22;

Fig. 24 is a perspective view of the cover plate which is mounted on the outer end of the bearing member shown in Fig. 23;

Fig. 25 is a partial front elevation, similar to that of Fig. 1, showing a modified construction of the movable gripping dog which, in this form, is mounted upon an eccentric;

Fig. 26 is a top plan view of the modified construction shown in Fig. 25;

Fig. 27 is a vertical section, taken on the line 27—27 of Fig. 26, showing a front elevation of the gripping dog and the operating lever when the dog is in engagement with the strap;

Fig. 28 is a front elevation, similar to Fig. 1, with parts in vertical section, showing the relative positions of the parts when the movable gripping dog and the holding dog are both out of engagement with the strap;

Fig. 29 is an irregular vertical section taken on the line 29—29 of Fig. 27;

Fig. 30 is a perspective view of the movable gripping dog shown in Fig. 25;

Fig. 31 is a perspective view of the dog-operating lever and latch shown in Fig. 25; and Fig. 32 is a perspective view of the pin on which the movable dog shown in Fig. 25 is eccentrically mounted.

As illustrated in the drawings, the invention comprises an integral frame having a base plate 25 adapted to seat upon the surface of a box or package 26 about which a flat flexible steel strap 27 is passed. The base plate 25 is provided with two forwardly projecting flanges 25a and 25b over which the free end portion 27a of the strap extends, the strap bridging the gap 25c between these flanges which is the region in which the interlocking joint is subsequently formed. After passing around the box or package 26, the supply end portion 27b of the strap is carried over another flange 28a which also rests upon the surface of the box or package 26 and which projects forwardly from a block 28 secured upon a sliding bar 29 arranged to move on the base plate parallel to the strap. The free end portion 27a of the strap is adapted to be secured on the base flange 25a by a gripping dog 30 which is pivotally mounted on a pin 31 projecting in a forward direction from the upwardly extending web portion 25d of the base plate. The gripping dog is retained in position on the pin 31 by a cotter pin 32 which extends transversely through an aperture on the outer end of the pin 31 and the gripping dog is normally moved into engagement with the end portion 27ᵃ of the strap by a coil spring 33 which is mounted on the pin 31 in a recess in the upper side of the gripping dog with one extremity bearing on the dog and the other extremity bearing against the horizontal frame portion 25ᵉ which is carried by the vertical web portion 25ᵈ of the base plate. The gripping dog 30 is provided on its lower edge with a serrated surface 30ᵃ adapted to engage the upper side of the end portion 27ᵃ of the strap, this serrated portion being offset toward the right, as viewed in Fig. 1, from a vertical plane containing the axis of the pivot pin 31 so that a pull upon the strap toward the left, as viewed in Fig. 1, will tend to tighten the grip of the dog 30 upon the strap, while a pull upon the strap in the opposite direction will tend to release it from its position beneath the dog. The gripping dog is provided between the gripping surface 30ᵃ and the pin 31 with an inwardly extending inclined slot 30ᶜ through which the supply portion 27ᵇ of the strap extends in passing from a reel or other source of supply. The gripping dog 30 has a handle 30ᵈ fitting over the inner end of the dog, as shown in Fig. 5, and projecting endwise beyond the base plate so that it may be engaged by the fingers of the operator for raising the gripping dog out of contact with the strap end 27ᵃ against the compression of the spring 33.

The supply portion 27ᵇ of the strap is adapted to be engaged on its upper side by a gripping dog 35 which is mounted on the block 28 by which the flange 28ᵃ is carried. This gripping dog is pivotally mounted upon a pin 36 which fits within the bore of a hollow shaft 37 by which the sliding bar 29, previously referred to, is actuated. As shown in Fig. 5, the pin 36 has a head 36ᵃ which fits against the outer face of the gripping dog 35, while the other end thereof is engaged by a transverse pin 38 which extends between two diametrically opposed lugs 37ᵃ projecting endwise from the extremity of the hollow shaft 37. The spaces between the lugs 37ᵃ are such that a considerable angular movement of the shaft 37 about the pin 36 is permitted without causing the transverse pin 38 to be engaged by the lugs 37ᵃ, as shown in Fig. 6. The gripping dog 35 is inclined downwardly and toward the left, as viewed in Fig. 1, and the lower end thereof is provided with a serrated surface 35ᵃ adapted to engage the upper surface of the strap 27ᵇ. Due to this inclination of the gripping dog, a movement of the gripping dog and of the block 28 in a direction tending to tighten the strap 27 about the box or package, causes the gripping dog to increase its grip upon the strap, while a movement of the block 28 in the reverse direction tends to release the strap from the gripping dog. A curved flange 28ᵇ is formed integrally with the block 28 and overlies the gripping dog 35, thus providing a curved bearing surface for the curved upper extremity 35ᵇ of the dog. As shown particularly in Fig. 5, the gripping dog is provided between its front and rear edges with a transverse slot 35ᶜ adapted to receive a coil spring 39 which is mounted around the pin 36 with one of its extremities engaging the wall of the slot 35ᶜ and with the other extremity engaging a shoulder 28ᶜ formed on the flange 28ᵇ of the block 28 so that the spring tends normally to move the gripping dog into engagement with the strap. The gripping dog is notched out on its front side to provide a flat transverse shoulder 35ᵈ which is positioned opposite to the flat face 36ᵇ which is formed on one side of the head 36ᵃ of the pin on which the gripping dog is mounted, as shown in Fig. 1. The head 36ᵃ of the pin is set into this notch and the shoulder 35ᵈ is spaced slightly from the flat face 36ᵇ so that a limited relative angular movement of the gripping dog with respect to the pin 36 is permitted.

Referring now to the means for effecting relative movement of the gripping dogs 30 and 35, block 28 which carries the gripping dog 35 is provided with a horizontally extending flange or plate 28ᵈ which seats upon the sliding bar 29, as shown particularly in Figs. 4, 5 and 10. The plate or flange 28ᵈ has a longitudinally extending rib or key 28ᵉ formed on its under side to fit within a longitudinal keyway 29ᵃ which is formed in the sliding bar, and the plate or flange 28ᵈ is secured to the bar by rivets which extend upwardly from the bar through apertures in the plate. In this way, the block 28 has a rigid connection with the sliding bar 29 which, in turn, is mounted to slide longitudinally of the base plate 25 in an under cut guideway 25ᵍ which is provided partially by flanges formed integrally with the base plate and partially by a block 40 which is secured to the base plate and has a flange overlying the upper edge of the sliding bar. The block 28 is notched out to receive the block 40 and is adapted to move over this block 40 when the sliding bar 29 is reciprocated. The block 28 is further provided with a forwardly projecting arm 28ᶠ located to the right of the flange 28ᵃ, as viewed in Fig. 1, and at a higher level so that it overlies the strap and prevents it from swinging upwardly away from the flange 28ᵃ.

The reciprocation of the sliding bar 29 is effected through the medium of a pinion 37ᵇ which is formed integrally with the hollow shaft 37, as shown in Figs. 5 and 10. This pinion meshes with rack teeth 40ᵇ which are formed on the block 40, previously referred to, so that when the shaft 37 is rotated the block 28 and the bar 29 are moved longitudinally of the apparatus, that is, parallel to the strap 27. The shaft 37 is journaled at one end in a bushing 41 which is mounted in an aperture formed in the block 28 and the other end thereof is mounted in a bushing 42 which is mounted in a bearing block 43 secured to the plate 28ᵈ of the block 28 by means of socket screws 44. A screw 44ᵃ engages the block 43 to prevent the removal of the pin 38, as shown in Fig. 10, and the flange of the base plate which overlies the rear edge of the bar 29 is notched out to permit the block 43 to be inserted axially over the end of the shaft 37 and the bushing 41. The lugs 37ᵃ on the shaft, which were previously referred to, project beyond the bearing block 43, as shown in Fig. 5. The shaft 37 is rotated in these bearings by the stretching lever 45 which is provided at its outer end with a spherical handle portion 45ᵃ and which is provided at its inner end with a hub portion 45ᵇ having a central bore of rectangular cross section which is fitted by the correspondingly shaped portion 37ᶜ of the shaft, thus providing a driving connection between the lever and the shaft so that when the shaft is oscillated in a plane extending parallel to the strap 27, the shaft 37 is moved angularly about the pin 36 and the bar 29 is caused to move longitudinally on the base plate. As shown in Fig. 10, the portions of the pin 36 which are engaged by the spring 39 and which lie within the portions 37ᵇ and 37ᶜ of the shaft are reduced in diameter, thus limiting the frictional resistance to the turning of the shaft about the pin on which the gripping dog is mounted. When the lever 45 is moved toward the left from the position shown in Fig. 1, the bar 29 moves in the same direction, thus causing a movement of the gripping dog 35 toward the gripping dog 30, with a resulting stretching of the strap 27 around the box or package 26. Inasmuch as the gripping dog 35 tends to release itself from the strap upon movement of the block 28 toward the right, as shown in Fig. 1, it will be apparent that the lever 45 may be reciprocated any number of times with corresponding reciprocations of the gripping dog 35 and the alternate gripping and releasing of the strap by this dog so that the strap 27 may be drawn taut around the package in successive increments until the desired degree of tautness is reached. The transverse pin 38 in the end of the pin 36 on which the gripping dog 35 is mounted, is so positioned with respect to the lugs 37ª extending endwise from the shaft 37 that, as the lever 45 approaches the extreme right-hand position shown in Fig. 1, these lugs engage the pin 38 and rotate the pin 36 with the shaft 37, with the result that the head 36ª of the pin 36, engaging the shoulder 35ᵈ on the gripping dog, causes the gripping dog to be lifted out of engagement with the strap portion 27ᵇ against the tension of the coil spring 39, thus automatically releasing the strap from the gripping dog upon an extreme movement of the lever 45 so that the strap may be passed from its position beneath the gripping dog after it has been drawn taut.

In addition to the gripping dogs 30 and 35, the apparatus of the present invention comprises a third gripping dog 47 which is pivotally mounted upon the outer end of a pin 48, as shown particularly in Figs. 1 and 15. The pin 48 is secured in the upwardly extending frame portion 25ʰ which is formed integrally with the base plate 25 and the lower end of this gripping dog is provided with a serrated surface 47ª which is adapted to co-act with that portion of the upper side of the strap portion 27ᵇ which rests upon a flange 25ⁱ formed integrally with the flange portion 25ʰ and extending in a forward direction over the flange 25ª and above the strap end 27ª, as shown in Fig. 7. The gripping dog 47 is inclined downwardly and toward the left, as viewed in Figs. 1 and 7, so that a movement of the supply portion 27ᵇ of the strap toward the right, as viewed in these figures, causes this dog to increase its grip upon the strap, while upon movement of the strap in the other direction, the gripping dog 47 will tend to release its grip upon the strap so that the strap may slide freely beneath it. The gripping dog 47 is normally moved into engagement with the strap portion 27ᵇ above the flange 25ⁱ by a coil spring 49 which is wound around the pin 48 within a notch 47ᵇ formed in the upper side of the gripping dog, as illustrated in Fig. 15. One end of this spring engages the flange 25ᵉ of the base plate and the other end engages the bottom of the notch 47ᵇ, as shown in Fig. 7, so that the spring is normally moved toward the flange 25ⁱ. This gripping dog 47 is capable of being moved out of engagement with the strap, simultaneously with the release of the gripping dog 35, upon movement of the stretching lever 45 to the extreme right-hand position, shown in Fig. 1, this release of the gripping dog being effected by a pin or lever 50, shown particularly in Fig. 15. This lever is provided at its forward end with a spherical extremity 50ª which is adapted to rock within a socket 47ᶜ formed in the rear side of the gripping dog near its lower edge and, at an intermediate point, the pin or lever 50 is provided with a rounded bearing portion 50ᵇ which is adapted to rock within an aperture 25ʲ formed in the upwardly extending frame portion 25ʰ of the base plate. The rear portion 50ᶜ of the pin or lever 50 projects over the sliding bar 29, as shown in Figs. 4 and 15, and when the sliding bar 29 reaches a predetermined position, this portion of the lever 50 is adapted to be engaged by an actuating pin 51 which is resiliently mounted in a recess in a bearing block 52 secured to the upper side of the sliding bar 29 by means of socket screws 53. A coil spring 54 surrounds the stem of the pin 51 within the block and this stem, extending through an opening at the end of the recess, is engaged by lock nuts 51ª. The bearing pin 50 is retained in its position engaging the socket in the gripping dog 47 and the bearing 25ʲ in the frame structure by a flange 25ᵏ which extends upwardly from the flange which overhangs the rear edge of the bar 29. When the gripping dog 35 is moved out of engagement with the strap by swinging the stretching lever 45 to its extreme right-hand position, as viewed in Fig. 1, the gripping dog 47 is simultaneously moved out of engagement with the portion 27ᵇ of the strap by the engagement of the pin 51 with the pin or lever 50. The gripping dog 47 may thus be elevated to permit the removal of the supply end of the strap after the part previously passed around the box or package has been cut off by the operation of the cutting mechanism hereinafter described, in order that the supply end may be placed beneath the gripping dog 30 in readiness for strapping another box or package. The spring 54 causes the plunger 51 to project normally a considerable distance from the right end of the block 52 and is of sufficient strength to cause the pin 50 to operate the gripping dog 47 except when the teeth of the dog are biting into a strap which is under tension when the dog 47 is engaging a strap under tension, and also when the dog has been elevated by the first engagement of the pin 51 with the pin 50, the spring 54 permits a continued movement of the bar 29 for offsetting a further elevation of the dog 35. During the operation of drawing a strap taut, the gripping dog 47 serves as a take-up device for holding the strap between successive stretching operations of the reciprocating gripping dog 35. Upon each movement of the dog 35 toward the left, as viewed in Fig. 1, the strap, being relatively stiff, is adapted to slide beneath the gripping dog 47. During the operation of drawing a strap taut, the lever 45 is not moved to the extreme position shown in Fig. 1 where it causes both of the gripping dogs 35 and 47 to release the strap.

The apparatus is provided with means for holding the strap ends in their proper overlapping relationship while the strap is being drawn taut around the package. This retaining means is shown particularly in Figs. 1, 5, 7, 9 and 11 and comprises a hook member 55 which is pivotally mounted on a pin 56 secured in the walls of a slot 25ˡ formed in a vertical flange or web 25ᵐ of the base plate which extends upwardly from and in spaced relation to the flange 25ᵇ, previously referred to, there being a rectangular notch 25ⁿ between these flanges, as shown in Fig. 11, which receives the inner edges of the overlapping portions 27ª and 27ᵇ of the strap. The lower edge of the flange 25ᵐ is inclined downwardly and inwardly to facilitate the insertion of the strap ends to their proper positions. When thus inserted, the downwardly extending projection 55ª at the end of the retaining member is adapted to prevent withdrawal of the strap ends, the member 55 being normally forced downwardly to the strap retaining position shown in Fig. 11, by means of a coil spring 57 which is mounted in a recess 25° formed in the flange 25ᵐ and which bears against the upper side of the member 55. The member 55 is provided rearwardly of the pivot pin 56 with a pin 55ᵇ which projects into the path of a cam 58 secured by a rivet 59 on the sliding bar 29. As shown in Figs. 6 and 11, the cam 58 is provided with an inclined surface 58ª which is adapted to engage and depress the arm 55ᵇ of the retaining member, thus elevating the body portion of the retaining member against the compression of the spring 57 until it is in such a position that the overlying strap ends may be freely removed from their positions above the flange 25ᵇ. The cam 58 is preferably so located on the sliding bar 29 that the elevation of the retaining member 55 is effected simultaneously with the elevation of the gripping dogs 35 and 47.

Having described the means by which the strap is drawn taut around the box or package, reference will now be made to the means by which the strap is cut off from the source of supply and a seal is applied to the overlapping strap ends. The seal employed with the apparatus is preferably the channel-shaped metal body 60, shown in Fig. 3, which comprises a back wall 60ª and side walls 60ᵇ which diverge from the back wall and which are preferably provided midway between their ends with punched projections 60ᶜ which serve to provide point-to-point contacts between the side walls of adjacent seals when a plurality of seals is arranged in nested relationship in a stack. The back walls of the seals are preferably provided with apertures 60ᵈ so that when a stack of seals is formed, the seals may be temporarily secured together by a piece of wire or the like inserted through the registering apertures and having its ends bent transversely so that the stack may be placed bodily in the magazine of the sealing tool, after which the connecting wire is withdrawn to permit the seals to be fed successively into the sealing apparatus. The point-to-point contact between the side walls of adjacent seals provided by the projection 60ᶜ provides for flexibility in the stack of seals so that the bundle may be readily inserted in the magazine while at the same time facilitating the withdrawal of the lowermost seal from the stack at each operation of the sealing apparatus. This form of seal and the resulting package of seals are described and claimed in the United States Patents Nos. 2,062,098 and 2,062,099, granted on November 24, 1936, on applications of Chester M. MacChesney.

When a seal of the type illustrated in Fig. 3 is applied to overlapping strap ends by the apparatus of the present invention, the back wall 60ª of the seal overlies the end portion 27ᵇ of the strap and the jaws of the sealing apparatus are adapted to bend the side walls 60ᵇ downwardly and inwardly so that they underlie and contact with the lower end portion 27ª of the strap. As hereinafter described, the supply portion 27ᵇ of the strap is cut off from the source of supply in such a manner that the transverse cut end 27ᶜ is located in close proximity to and preferably in substantial alignment with one end of the back wall 60ª of the seal. The final act of the sealing operation effected by the jaws of the sealing head is that of shearing the lateral edges of the strap ends and the seal along parallel lines 60ᵉ, as shown in Fig. 2, thus forming cuts which extend through the margins of the seal and through the marginal portions of the strap ends. The cuts are arranged in pairs and the jaws are adapted to deflect the metal between the cuts of each pair downwardly to form angularly disposed lugs 60ᶠ, thus providing a series of abutting shoulders between the seal and the strap ends which prevent relative longitudinal movement of the strap ends. The seals 60 are preferably formed of steel or other metal which is comparatively stiff and rigid, but sufficiently ductile to permit them to be bent about the strap ends and to retain their form after being bent.

The seals are supplied to the sealing head from a vertical seal storage magazine 65 which is mounted on the horizontal flange 25ᵉ of the base plate, previously referred to, as shown in Figs. 1 and 15, and which is secured to the vertically extending web or flange 25ᵖ of the frame structure by means of a screw 66 which passes through the back wall of the magazine and also through a lug 67ª formed on the end of a housing 67 which contains the mechanism by which seals are fed from the lower end of the magazine to the sealing head hereinafter described. The frame member 25ᵖ which thus supports the magazine 65 is provided at ts ends with bosses 25ᑫ in which are secured the vertical arms of a handle 70 which is of inverted U-shape form having a horizontal portion 70ª adapted to be engaged by the hand of the operator. This handle is located in a vertical plane parallel to the plane in which the handle 45 moves and is so positioned that the entire apparatus may be picked up with one hand and will retain itself in a balanced position while being moved about. The handle 70 may also be engaged by one hand of the operator for holding the apparatus while using the other hand to manipulate one of the operating levers. The magazine 65 terminates somewhat below and forwardly of the handle 70 and is provided in its forward wall with a vertical slot 65ª through which access may be had to the stack of seals 60 located therein. At the lower end of the magaine, the flange 25ᵉ of the base plate is provided with an inwardly extending notch 25ʳ which permits access to the lowermost seal of the stack in case it is desired to remove all of the seals from the magazine.

The seals are held in place in the magazine and move downwardly therein by means of a spring-actuated retaining member 71 constructed in the form of a hollow metal body of U-shaped horizontal cross section provided along its lateral edges with flanges 71ª which are adapted to fit between the front and the rear walls of the magazine and provided at its upper end with a curved handle 71ᵇ adapted to be engaged by the fingers of the operator. A split pin 72 extends between the side walls of the member 71 whilch are also secured together by a rivet 73. A flat spring 74 is secured to and wound around the split pin 72 between the side walls of the member 71 and emerges from the side wall thereof between the flanges 71ª. This spring extends downwardly adjacent to one end wall of the magazine and its lower end is secured around a pin 75 which extends between the front and rear walls of the magazine. The adjacent end wall of the magazine is provided at its upper end with a notch 65ᵇ which permits the spring, when extended, to be passed through this slot so that the retaining member 71 may be tilted out of the magazine to the position shown in Fig. 1, thus allowing the operator to insert a package of seals into the magazine. The side walls of the retaining member 71 are preferably flared downwardly and outwardly on their inner sides, as shown at 71ᶜ, in Fig. 15, so that they conform to the flare of the side walls of the seals and fit over the side walls of the uppermost seal in the stack. When the retaining member 71 is in place in the magazine, the coil spring wound around the split pin 72 serves to assist the force of gravity in moving the member 71 downwardly so that the lowermost seal of the stack is maintained in contact with the flange 25ᵉ which constitutes the bottom wall of the magazine.

The movable head 80 which receives the seals from the magazine 65 and applies them to the overlapping strap ends, comprises a hollow frame or housing 81 made up of two complementary side plates or frame sections 81ᵃ and 81ᵇ which are secured together by the screws 82 and the cap screw 83, as shown particularly in Fig. 7. The side plate 81ᵇ has undercut grooves or guideways 81ᶜ formed therein, as shown in Fig. 4, to receive the oppositely directed flanges 65ᵈ which are formed integrally with the magazine 65. The frame or housing of the movable head is thus mounted to slide vertically toward and from those portions of the overlapping strap ends which extend across the gap 25ᶜ between the flanges 25ᵃ and 25ᵇ of the base plate. The side plates 81ᵃ and 81ᵇ of the sliding frame 81 are provided with opposed grooves in their inner faces forming a vertical passage 81ᵈ of rectangular cross section in which the plunger 84 has a sliding fit. This plunger is adapted to be moved vertically by the mechanism hereinafter described, and is arranged to actuate the sealing jaws 85 which are shown particularly in Figs. 12, 13 and 14. These jaws are pivotally mounted on pins 86 which extend between the side plates 81ᵃ and 81ᵇ of the head and they are adapted to be moved about their pivots by a pair of links 87 through which they are connected with the plunger 84. This plunger is of the form shown particularly in Figs. 4, 11 and 12, comprising a pair of parallel plates or flanges 84ᵃ connected by a central web 84ᵇ which has a shorter vertical dimension than the flanges 84ᵃ, thus leaving a slot which is engaged by the upper ends of the links 87. The upper ends of these links are secured to the side flanges 84ᵃ of the plunger by a pin 88 which has its head counter-sunk in one of the side flanges 84ᵃ, as shown in Fig. 9, with its ends adapted to engage the side plates of the hollow frame 81 during relative vertical movement of the plunger within the head. The lower end of each link 87 is pivotally connected to the upper arm of one of the jaw members 85 by means of a pin 89, the ends of these pins being arranged to slide vertically within and to be retained against endwise movement by the side plates 81ᵃ and 81ᵇ of the head. Since the links 87 overlap each other at their upper ends where they are engaged by the pin 88, a washer 90 is provided on each pin 89 at one side of the connected link 87 to fill in the space between the lower end of the link and the opposite portion of the jaw member 85 to which it is connected, as shown in Fig. 14.

Each jaw member 85 is made up of a plurality of plates or laminations 85ᵃ comprising three bending dies 85ᵇ and two alternately arranged cutting or shearing dies 85ᶜ. All of these dies or plates are engaged by the pivot pins 86 on which the jaw members are mounted, and the laminations of each jaw are prevented from having relative angular movement about these pivot pins by other pins 91 which engage registering apertures in the laminations and which abut at their ends against the side plates 81ᵃ and 81ᵇ of the head. The two outer laminations 85ᵃ of each jaw are extended upwardly beyond the other laminations to form arms 85ᵈ which extend on opposite sides of the links 87 and the washers 90. The bending dies 85ᵇ of each jaw are provided at their lower ends with under cut portions 85ᵉ located above the projecting hook portions 85ᶠ, and these hook portions 85ᶠ terminate in registering projections 85ᵍ which are adapted to receive and support the edges of the side walls 60ᵇ of one of the channel-shaped seals 60 when this seal is fed from the magazine 65 to a position between the jaws, as shown in Fig. 12. The cutting or shearing dies 85ᶜ, which are fixed against relative angular movement with respect to the bending dies in each jaw member, are provided at their lower ends with cutting or shearing edges 85ʰ which are spaced inwardly from and between the projecting hook portions 85ᶠ of the adjacent bending dies. With this arrangement, upon relative angular movement of the two jaws 85 about their pivot pins 86, the bending dies 85ᵇ are adapted first to bend the side walls of the seal downwardly and inwardly about the overlapping strap ends, as shown in Fig. 14, with the edges of the strap and seal extending into the under cut recesses 85ᵉ, and with the completion of this bending movement, the cutting edges 85ʰ of the shearing dies come into action to shearing lateral edges of the strap and seal to form the type of interlocking joint shown in Fig. 2.

In order to hold a seal in engagement with the projections 85ᵍ of the opopsite jaws during the operation of moving the seal from the elevated position shown in Fig. 12 to the position shown in Fig. 13, where it rests upon the overlapping strap ends, and in order to support the top or back wall of the seal during the operation of bending it about the strap ends and deforming its edges, a supporting saddle or pressure member 93 is provided between the jaw members 85, as shown in Figs. 12, 13 and 14. This saddle member is of the same width as the jaws, fitting loosely between the side plates 81ᵃ and 81ᵇ of the head, and it is provided on its opposite sides with concave surfaces 93ᵃ which conform generally, but not exactly, to the arcuate surfaces 85ⁱ which are formed on the laminations of the jaws 85 concentric with the axes of the pivot pins 86 on which the jaws are mounted. A clearance 94 is thus provided between the saddle member 93 and the opposite curved faces of the jaws which permits some relative movement vertically of the saddle member between the jaws, although the jaws retain the saddle member in place between the side plates of the head. The lower face 93ᵇ of the saddle member is adapted to engage the upper side of the back wall of the seal 60 and the upper face of this member is provided with a pair of sockets 93ᶜ in which are mounted two coil springs 95. The upper ends of these coil springs are received within sockets 96ᵃ formed in the lower part of the supporting member 96 which extends between the side plates 81ᵃ and 81ᵇ of the head, as shown particularly in Figs. 8 and 12, being secured in position by the previously described bolt or cap screw 83 which has a threaded extremity engaging a threaded aperture in the side plate 81b and which is provided at its other end with a head 83a overlapping the locking plate 97 which is engaged by this stud and which enters notches in the projecting ends of the pivot pins 86, as shown in Fig. 8. These pins 86 have their heads counter-sunk in the outer face of the side plate 81b and the plate 97 thus retains them in position.

With the arrangement thus described, the springs 95 force the saddle 93 downwardly when the head is in its extreme upper position and the jaws 85 are spread apart, as shown in Fig. 12, so that when a seal 60 is fed from the magazine into a position between the jaws 85, by the mechanism hereinafter described, the saddle member is forced with a resilient pressure against the back wall of the seal so that the edges of its side walls 60b are pressed against the projections 85g of the jaws, thus holding the seal firmly in position while the head 80 is being lowered to position the seal on the overlapping strap ends, as shown in Fig. 13. During the subsequent relative movement of the jaws for the purpose of bending the side walls of the seal about the overlapping strap ends and deforming the edges of the strap and seal to provide an interlocking joint, the saddle member 93 is adapted to move upwardly to a limited extent, due to the presence of the clearances 94 so that the seal and the overlapping strap ends are permitted to adjust themselves vertically against the compression of the springs 95 as the jaws move about their pivots and complete the formation of the joint. It will be observed that the downward movement of the plunger 84 is limited by its engagement with the supporting member 96 which is mounted upon the stud 83, thus also limiting the relative pivotal movement of the jaws 85 as they close in upon each other to deform the seal and the enclosed strap ends.

The downward movement of the plunger 84 is opposed by two coil springs 100 which are secured at their lower ends to a transverse pin 101 extending through the lower part of the central web 84b, as shown in Figs. 12 and 14. The upper ends of these springs are secured to a cross bar 102 which has downwardly turned extremities secured in the upper end of the side plate 81a of the head. After the plunger has been moved downwardly within the frame 81 of the head, with a resulting closing of the jaws 85 upon the seal, the extended springs 100 will tend to return the plunger 84 to its upper position with a resulting separation of the lower portions of the jaws and this action of the springs is supplemented by the positive operating mechanism hereinafter described which actuates the plunger through the rack bar 84c formed on the vertical face thereof and arranged to move vertically in the slot 81e formed in the plate 81a of the head.

The teeth of the rack bar 84c mesh with a pinion 105a formed integrally with a shaft 105 which is journaled in bearings formed in the ears 81f and 81g formed on the side plate 81a on opposite sides of the slot 81e, as shown particularly in Fig. 4. The shaft 105 has the form shown particularly in Fig. 22, being provided with a cylindrical portion 105b at one side of the pinion which is journaled in the ear 85f and having another cylindrical portion 105c at the other side of the pinion which is journaled in a bushing 106 secured in the ear 81g. The shaft 105 is adapted to turn in its bearings for the purpose of effecting vertical movement of the plunger 84 in the frame 81 of the head and it also serves as the means through which a vertical motion is imparted to the head independently of the movement of the plunger. The head 80 is directly supported by a tilting frame 107 comprising a pair of side members 107a connected by a transverse web 107b, as shown particularly in Figs. 4, 7 and 9. The side members 107a are provided with apertures which are fitted by the portion 105b of the shaft 105 and by the projecting portion of the bushing 106, so that a swinging movement of the frame 107 is adapted to raise or lower the head 80 and its frame 81. The side members 107a of the tilting frame extend on opposite sides of and in contact with the ears 81f and 81g of the frame and, at their other ends they are adapted to receive between them the upper end of a pivoted supporting member 110. The supporting member 110 comprises a plate 110a extending between the side plates 110b and provided at its upper end with a boss 110c in which there is journaled an elongated bushing or hollow pin 111 which is, in turn journaled in apertures formed in the side plates 107a of the tilting frame 107. The bushing 111 is secured in place by a set screw 112 which engages a threaded aperture in a boss 110d formed on the supporting member 110 and engaging, at its inner end, an annular groove 111a formed in the bushing 111, as shown particularly in Figs. 4, 7 and 20. The tilting frame 107 is thus capable of pivotal movement about the upper end of the supporting member 110.

The lower end of the supporting member 110 is provided with a boss or hub portion 110e having a pivotal engagement with a pin or axle 113, which has its outer end fitting within an aperture formed in a flange 25s extending upwardly from the base plate and which has its other end mounted in a boss 25t which extends forwardly from the upright frame portion 25p of the base plate, as shown in Fig. 10. A set screw 114 engages the boss 25t and enters an annular groove 113a in the pin or axle to prevent endwise movement thereof. A washer 115 is mounted on the pin between the outer face of the supporting member 110 and the flange 25s.

With the foregoing arrangement, the supporting member 110 is adapted to pivot about the pin 113 and the tilting frame 107 is adapted to pivot about the bushing or hollow pin 111 to allow the frame 81 of the head to move vertically toward and from the overlapping strap ends. After the member 110 has swung toward the left, as viewed in Figs. 1 and 7, and the frame 107 has swung downwardly to position the seal 60 carried by the head on the overlapping strap ends, the shaft 105 is adapted to be turned to cause the pinion 105a to move the plunger 84 downwardly. All of these operations, and the corresponding reverse movements, are adapted to be effected by a sealing lever 120 which is mounted on the end of the shaft 105 to swing in a vertical plane parallel to a vertical plane containing the axis of the strap. The lever 120 is provided with a hub portion 120a which is journaled upon the forward extremity 105d of the shaft 105, as illustrated in Fig. 4. The shaft at this point is recessed to provide a plurality of longitudinally extending ribs 105e, shown particularly in Fig. 22, which are spaced apart circumferentially of the shaft and which are adapted to receive between them a plurality of longitudinally extending splines or keys 120c which are formed within the bore of the hub 120ᵃ of the lever 120. When the lever 120 is released from the tilting frame 107, as hereinafter described, the ribs 105ᵉ of the shaft are adapted to coact with the keys or splines 120ᶜ on the lever to form a driving connection between the lever and the shaft which is made use of in effecting a downward movement of the plunger 84 and a corresponding closing movement of the jaws 85 at the time of effecting the sealing operation.

Another driving connection between the lever 120 and the shaft 105 is provided for permitting the turning of the shaft by the lever to separate the jaws at the conclusion of the sealing operation, it being apparent that this reverse operation can not be effected by the ribs 105ᵉ and the keys or splines 120ᶜ because of the lost motion between these parts upon the movement of the lever 120 toward the right, as viewed in Fig. 1. The means for establishing this additional locking connection comprises a locking plate 121 mounted on an extremity of the shaft 105 and seating against the outer face of the hub portion 120ᵃ of the lever. This locking plate and the lever are secured on the shaft by a nut 122 which engages the threaded extremity 105ᶠ of the shaft and seats against a washer 122ᵃ where it is secured by a set screw 123.

The locking plate 121 is of pear-shape form, the projecting arm thereof being provided with an aperture 121ᵃ of sufficient size to receive one rounded extremity of a locking pin 124 which occupies a cylindrical passageway 120ᵇ extending through the hub of the lever. On the inner side of the hub of the lever, another locking plate 125 is journaled upon the projecting end of the bushing 106 and secured to the face of the adjacent tilting frame 107 by means of a pin 126, as illustrated particularly in Fig. 20. The plate 125 is provided with a recess 125ᵃ adapted to register with the passageway 120ᵇ in the hub of the lever. The recess 125ᵃ is adapted to receive the inner semi-spherical extremity of the locking pin 124 and, like the recess or aperture 121ᵃ, its walls are tapered so that pressure exerted on the adjacent end of the pin by relative movement of the lever and the locking plate in which the aperture is formed, will tend to wedge the pin 124 away from the locking plate into the aperture 120ᵇ. The locking plate 121 is held against rotation with respect to the shaft 105 by the engagement of the extremities 105ᵍ of the keys or splines 105ᵉ formed on the shaft with keyways 121ᵇ which are formed in the locking plate, as shown in Fig. 24. When the locking pin 124 is moved outwardly to engage the recess 121ᵃ in the locking plate 121, a driving connection is established between the locking plate and the lever 120 so that movement of the lever will then operate through the locking plate 121 to turn the shaft 105 in its bearings. When the locking pin 124 is moved inwardly so that its inner end engages the recess 125ᵃ in the locking plate 125, mounted to swing with the tilting frame 107, the outer end of the pin will be out of engagement with the recess 121ᵃ and the lever 120 may then swing about its pivot without turning the shaft 105. This locking connection formed by the pin 124 is made use of only for rotating the shaft 105 to separate the jaws, but it is established in the course of the movement of the lever toward the left in Fig. 1 before the jaws have been closed upon each other.

The lever 120 and its hub 120ᵃ are provided with an integral depending flange 120ᵈ of arcuate shape, and on the face of this flange there is formed an integral lug or boss 120ᵉ having adjustably mounted therein, a threaded stud 127 which is secured in adjusted position by a lock nut 128. The end of this stud beyond the nut 128 is adapted to engage a hard metal stop member 129 which is secured in a projecting flange 81ʲ formed on the side plate 81ᵇ of the head. When the lever 120 is swung downwardly and toward the right, as viewed in Figs. 1 and 19, the stud 127 is adapted to engage the stop member 129 to limit the movement of the lever and the corresponding upward movement of the head 80. By accordingly adjusting the position of the stud 127 in the lug 120ᵉ, the extreme upper position of the head 80 may be precisely located so that it will properly receive a seal from the magazine due to the actuation of the seal feeding mechanism, hereinafter described.

The lever 120 is provided adjacent the right-hand margin of the flange 120ᵈ, as viewed in Fig. 19, with a lug 120ᶠ having a flat lower face adapted to engage a projecting lug 107ᶜ formed on the tilting frame 107. After a predetermined movement of the lever 120 from the position shown by dotted lines in Fig. 19 to the position shown by full lines in that figure, the lug 120ᶠ will engage the lug 107ᶜ to cause a direct actuation of the tilting frame 107 by the lever in elevating the head 80 from its lower position. When the lever 120 is in the position shown by dotted lines in Fig. 19, which corresponds to the position in which the shaft 105 has been actuated to lower the plunger 84 and effect relative movement of the sealing jaws 85, a boss 120ᵍ formed on the lever 120, substantially opposite the lug 120ᶠ, will engage the surface 81ᵏ on the upper end of the flange 81ʲ carried by the head, thus limiting the movement of the jaws 85 in closing upon each other and supplementing the action of the member 96 in engaging the lower end of the plunger 84 for this purpose, as heretofore described.

Assuming that the head 80 has been elevated, and that the lever 120 occupies its extreme right-hand position, as shown in Fig. 1, and that it is desired to lower the head from the position shown in Fig. 1, it is necessary to establish a driving connection between the lever 120 and the tilting frame 107 so that this frame may be swung about the hollow pin or bushing 111 and the supporting member 110 moved forwardly about its pivot 113, without causing rotation of the shaft 105 which actuates the jaws. This locking connection is normally established by a locking pin 130, shown particularly in Figs. 4, 10 and 20, which is mounted within the hollow pin or bushing 111. This pin is provided at one end with an enlarged cylindrical head 130ᵃ which is adapted to fit within a cup-shaped locking member 131 mounted in a recess in the inner face of the lever 120. At its other end, the locking pin 130 is provided with an enlarged cylindrical portion 130ᵇ which is located within the enlarged end 111ᵃ of the pin or bushing 111 which seats against the rear face of the tilting frame 107. The enlarged portion 130ᵇ of the locking pin has formed integrally therewith an annular flange 130ᶜ constructed in the form of a double truncated cone. The end face 130ᵈ of the pin 130 normally occupies a position within and in proximity to the inner face of the vertical frame member 35ᵖ, as shown in Fig. 4, and the flange 130ᶜ then abuts against the enlarged end of the bushing 111. When the pin 130 is in this position, the extremity 130ᵃ thereof engages the cup-shaped locking member 131, as shown in Fig. 4, so that when the lever 120 is swung upwardly and toward the left, as viewed in Figs. 1 and 4, the tilting frame 107 will be swung downwardly about the bushing 111 and the supporting member 110 will swing toward the left, as viewed in Fig. 1, about the pin 113. When the lever 120 reaches a predetermined position, namely, the position corresponding to the lower position of the sealing head 80 which positions a seal on the overlapping strap ends, as shown in Fig. 13, one of the annular inclined faces of the flange 130ᶜ on the locking pin 130 engages the inclined face 133ᵃ of a stationary cam 133 which is secured to the frame member 25ᵖ by means of a rivet 134. The inclined face 133ᵃ forces the flange 130ᶜ of the locking pin into a tapered recess 25ᵘ formed in the member 25ᵖ. This endwise movement of the pin 130 withdraws the extremity 130ᵃ thereof from the cup-shaped locking member 131 carried by the sealing lever, so that the lever 120 is then free to move about its pivot on the shaft 105 independently of the tilting frame 107 which then remains stationary during further movement of the lever 120 in the same direction.

During the movement of the lever 120 toward the left, as viewed in Fig. 1, to the point where the pin 130 moves out of engagement with the locking member 131 and into engagement with the recess 25ᵘ in the stationary frame member, the locking pin 124 in the hub of the lever occupies its inner position and the pin moves within the flat face of the outer locking member 121, but, when this point in the movement of the member 120 is reached, the pin 124 occupies a position in registry with the recess 121ᵃ in the locking plate 121 and, the lever 120 being then released by the locking pin 130, further pressure on the lever tending to move it toward the left causes the inner end of the pin 124 to be wedged outwardly by the inclined annular face of the recess 125ᵃ in the inner locking plate 125. The pin 124 then moves outwardly until the outer rounded end thereof engages to the fullest extent the recess 121ᵃ in the outer locking plate and the inner end of the pin 124 will then move past the flat outer face of the inner plate 125. A driving connection is thus established between the lever 120 and the shaft 105 through the pin 124 and the plate 121 and, at the same time, another driving connection is established between the lever 120 and the shaft through the splines 105ᵉ and the keys 120ᶜ. Although the first of these connections could be employed alone for actuating the jaws 85 if it were strong enough, this driving connection is established primarily for subsequently opening the jaws after the sealing operation has been completed and the second driving connection formed by the splines 105ᵉ and the keys 120ᶜ is relied upon for transmitting to the shaft 105 the pressure which is exerted upon the lever 120 for effecting relative movement of the jaws 85 during the operation of shearing and bending the lateral edges of the seal and the enclosed strap ends. When this operation is completed, the lever 120 will occupy the position shown by dotted lines in Fig. 19 with the lug 120ᵍ resting upon the upper surface 81ʲ of the stationary flange 81ⁱ.

Upon reverse movement of the lever 120 toward the right, as viewed in Figs. 1 and 19, there will be lost motion between the splines 105ᵉ and the keys 120ᶜ which will occupy the relative position shown in Fig. 19 and, during this initial stage of the return movement, the locking connection established between the pin 124 and the locking plate 121 is relied upon for turning the shaft 105 and releasing the jaws 85 from the completed strap joint, an operation which is assisted by the action of the coil springs 100 previously referred to. After a predetermined pivotal movement of the lever 120 toward the right, the lug 120ᶠ on the lever engages the lug 107ᶜ carried by the tilting frame, as shown by full lines in Fig. 19, so that further movement in the same direction causes an elevation of the tilting frame 107 about the hollow pivot pin or bushing 111, thus elevating the head 80 from its lower position. At the beginning of this pivotal movement of the tilting frame 107, the pressure of the inclined face of the flange 130ᶜ on the locking pin 130 against the inclined face of the recess 25ᵘ in the stationary frame member will cause the pin 130 to be moved in a forward direction and into engagement with the cup-shaped locking member 131 carried by the lever. This driving connection is not necessary to the continued movement of the lever 120 toward the right, as viewed in Fig. 1, because of the continued engagement of the lugs 120ᶠ and 107ᶜ, but the locking engagement established by the pin 130 is formed in readiness for the succeeding forward motion of the lever 120, that is, its succeeding motion toward the left, as viewed in Fig. 1.

The foregoing description of the construction and operation of the sealing mechanism has not taken into account the means by which the seals are fed from the magazine 65 to the sealing jaws. This seal feeding means comprises a feeding bar or plunger 135 which is mounted to slide horizontally on the flange or plate 25ʰ of the base plate or frame within a rectangular guideway 67ᵇ, shown in Figs. 7 and 16, formed in the lower wall 67ᶜ of the housing 67, previously referred to, which contains most of the mechanism by which the feeding of the seals is controlled. The feeding plunger is of substantially the same width as the back wall 60ᵃ of one of the seals 60, as shown in Fig. 15, the forward end thereof being provided with tapered surfaces 135ᵃ which converge toward the end of the plunger and terminate in a transverse vertical end wall 135ᵇ. A small flange 135ᶜ projects toward the right, as viewed in Fig. 9, from the end of the plunger and this flange is so located and is of such dimensions that it is adapted to project over the top wall 60ᵃ of the lowermost seal in the stack and to extend beneath the top wall of the next adjacent seal. When the plunger is moved toward the right from the position shown in Fig. 9, it is adapted to move through rectangular apertures 65ᶜ which are formed in the bottoms of the side walls 65ᵈ of the seal magazine and, in so doing, the plunger engages and moves the lowermost seal of the stack from the position shown in Fig. 9, to the position shown in Fig. 7, where the lowermost seal has been moved to a position between the jaws 85 of the sealing tool with the lower edges of the side walls of the seal resting upon the projections 85ᵍ of the jaws, as shown in Fig. 12. The movement of the seal in this direction is arrested by the engagement of the end of the seal with the projecting portion 81ⁱ of the side plate 81ᵇ of the head, as illustrated in Fig. 7. After the seal has been fed to this position, the plunger 135 is returned to its retracted position and the head 80 is lowered to place the seal over the overlapping strap ends, as shown in Fig. 13. The plunger 135 is provided with a longitudinal groove 135ᵈ so that when it moves through the magazine in the process of feeding a seal, it will not catch on the next seal in the stack in the event that a burr has been formed on that seal by punching the hole 60$^d$ therein.

The movement of the seal feeding plunger 135 is effected by a lever arm 136$^a$ which is formed as a part of a combination lever 136 having its hub pivoted on a pin or bolt 137, as shown particularly in Figs. 4, 8, 9, 16 and 17. The end of the body portion of the pin 137 fits within a recess 67$^c$ in a boss 67$^d$ which is formed integrally with the forward wall of the housing 67. The reduced threaded extremity 137$^a$ of the pin or bolt extends through an aperture formed in the outer end of this boss and the threaded portion is engaged at its outer end by a washer 138 and a nut 139. One edge of the washer is bent around the flat side 67$^e$ of the boss and, after the nut 139 has been tightened, the other edge of the washer is bent forwardly to engage a flat side of the nut, thus holding the nut against rotation. In this way, the pin or bolt 137 is secured rigidly in position and the combination lever 136 is adapted to rock thereon to effect reciprocatory movements of the lever arm 136$^a$ which is provided at its lower end with an enlarged head 136$^b$ engaging an aperture 135$^e$ formed in the feeding plunger. The head 136$^b$ of the lever arm 136$^a$ has rounded surfaces to coact with the vertical faces of the aperture 135$^d$.

The combination lever 136 is provided with a relatively short hook-shaped arm 136$^c$ engaged by the upper hooked end of a coil spring 140 which has its lower hooked end engaging an aperture in a boss 67$^e$ formed on the lower wall of the housing 67, as illustrated particularly in Figs. 9 and 16. This spring 140 tends normally to rock the lever 136 about its pivot in a direction adapted to cause a seal feeding movement of the plunger 135. The action of the spring 140 is normally restrained, and the plunger 135 is held in its retracted position, due to the operation of certain latch mechanism comprising a lever arm 136$^d$ which is formed integrally with the hub of the combination lever 136 and which has mounted in the lower end thereof a rearwardly projecting pin 141, shown particularly in Figs. 4 and 16. This pin has pivoted thereon a latch member 142 having the form shown particularly in Fig. 18. This latch member has an arm 142$^a$ which extends toward the left, as viewed in Figs. 8 and 9, and which terminates in a transverse flange 142$^b$ carrying an upwardly extending tooth 142$^c$ provided with an arcuate upper surface 142$^d$. The tooth 142$^c$ is adapted to project upwardly behind the head 143$^a$ of a stationary detent pin 143 which has an enlarged threaded portion 143$^b$ engaging a threaded aperture in the end wall of the housing 67. This detent is secured in adjusted position by a set screw 144 extending downwardly through a threaded aperture in the upper part of the end wall of this housing. The arm 142$^a$ of the latch 142 is provided with an aperture 142$^e$ engaged by the lower end of a coil spring 145 which has its upper end pivotally connected to a lever arm 136$^e$ which is also formed integrally with the hub of the combination lever 136. The coil spring 145 tends normally to move the arm 142$^a$ of the latch upwardly so that the tooth 142$^c$ of the latch is retained behind the head 143$^a$ of the stationary detent. The latch member thus operates through the pin 141 and the arm 136$^d$ of the combination lever to hold the coil spring 140 extended and to maintain the feeding plunger 135 in its retracted position. The extent of the upward movement of the arm 142$^a$ of the latch member under the influence of the spring 145 is limited by the engagement with the hub of the combination lever 136 of a projecting arm 142$^f$ which is formed on the upper part of the latch member and which normally occupies the position shown in Fig. 17. The head 143$^a$ of the detent 143 is provided with an annular inclined end face 143$^c$ in the form of a truncated cone, which is adapted to engage the tooth 142$^c$ of the latch member when the lever 136 is swung from the position shown in Fig. 7 toward that shown in Fig. 17, with the result that the tooth 142$^c$ snaps under the head 143$^a$ of the detent member and automatically assumes the position shown in Fig. 17.

The release of the latch member 142 from the detent 143, to permit a feeding movement of the plunger 135 under the influence of the spring 140, is effected by the movable head 80 through a link 148. For this purpose, the link 148 is connected at its upper end to the shaft 105 which moves with the sealing head. This end of the link has a longitudinal slot 148$^a$ formed therein and this slot is slidably engaged by a block 149 which is provided with a non-circular aperture to receive the threaded and flattened extremity 105$^h$ of the shaft. A pair of washers 150 are mounted on the shaft on opposite sides of the block 149 and they overlap the link 148 around the slot 148$^a$, as illustrated in Fig. 4. A nut 151 engages the threaded end of the shaft 105. The block has some movement longitudinally of the slot in order to allow for vertical movement of the shaft 105 at an angle to the longitudinal axis of the link, but when the head 80 approaches the upper limit of its travel, the block engages the upper end of the slot and the link is moved endwise to cause the lower part thereof to trip the latch 142 and release it from the detent 143.

The lower end of the link 148 has a longitudinal slot 148$^b$ which is slidably engaged by the closely fitting pin 141 on which the latch 142 is mounted. A cotter pin 152 extends transversely through the end portion of the pin 141 to hold the latch and the link in position on the pin 141. The link 148 is provided at its lower extremity with a depending arm 148$^c$ having a transverse flange 148$^d$ which projects into the plane of the body portion of the latch member 142. When the link 148 is moved upwardly and toward the right from the position shown in Fig. 17, by the upward movement of the head 80, the flange 148$^d$ on the link will engage the depending arm 142$^g$ of the latch member and rock the latch member about its pivot on the pin 141 against the tension of the spring 145, with the result that the tooth 142$^c$ is released from the head of the detent pin 143 so that the spring 140 is allowed to operate to cause a feeding movement of the seal feeding plunger 135. When this seal feeding movement is completed, the plunger 135 will occupy the position shown in Fig. 7, and the pin 141 will have moved to the upper end of the slot 148$^b$ in the link 148, while at the same time the link will have been forced upwardly so that the block 149 will occupy the lower end of the slot 148$^a$ in the upper part of the link. Upon the succeeding downward movement of the head 80, the initial movement actuates the link 148 to start a reverse movement of the plunger 135 before the extremity of this plunger is engaged by the side plate 81$^b$ of the head and, as the downward movement of the head continues, the plunger is restored to the normal position shown in Fig. 9 and the latch member 142 snaps back into engagement with the detent 143 so that the spring 140 is again put under tension in readiness for a succeeding feeding movement of the plunger. As a precaution, in the event that the plunger 135 does not move out of the path of the head before the head reaches that position, the lower end of the side plate 81$^b$ is provided with an inclined wedging surface 81$^m$ shown in Fig. 7, which is adapted to engage the end of the plunger 135 and force it out of the path of the head. A shield 153 extends vertically at the side of the magazine 65 to protect the mechanism within the housing 68.

In addition to controlling the actuation of the seal feeding mechanism, the movable head 80 also serves to control the actuation of the mechanism by which the supply portion of the strap is cut off and the two ends of the strap placed in proximity to each other in readiness to receive the seal. This cutting mechanism, which is shown particularly in Figs. 1, 4, 5, 9, 10, 12 and 19, comprises a shearing blade 154, which is stationary during the cutting operation, and a relatively movable blade 155, both of which are carried by a lever 156 which is pivoted on a stud 157 mounted in a boss 25$^v$ carried by the upright plate 25$^p$ of the frame, as shown particularly in Fig. 12. A lock washer 158 seats against the outer face of the lever 156 and a nut 159 engages the threaded end of the stud. The lever 156 is provided on its inner side with a boss 156$^a$ which is adapted to rotate on the surface of the boss 25$^w$ which is formed on the rear face of the plate 25$^p$. The lever 156 is provided at its lower end with a pair of spaced flanges 156$^b$, shown particularly in Fig. 5, which receive between them the enlarged rear extremities of the shearing blades 154 and 155. These extremities of the blades are apertured for engagement by a bolt 160 which passes through the flanges and which is engaged at its end by a washer 161 and a nut 162. A washer 163 is inserted between the blade 154 and the adjacent flange 156$^b$ and a pin 164 is secured in registering apertures in these parts to hold the blade 154 against movement about the bolt 160 on which the other blade 155 is adapted to have pivotal movement. The blade 154 extends downwardly and forwardly from the lower end of the lever 156 and terminates in a part 154$^a$ which is spaced slightly above the base flange 25$^a$ to permit the end portion 27$^a$ of the strap to pass beneath it, as shown in Figs. 1 and 12. This horizontal portion 154$^a$ of the shearing blade 154 has the cross section shown particularly in Fig. 9, being provided with a sharp cutting edge 154$^b$ which is adapted to coact with a similar cutting edge 155$^b$ formed on the blade portion 155$^a$ of the pivoted shearing blade. This blade 155 is provided at its forward end with an upwardly extending lug 155$^c$ which is adapted to coact with the lower edge 81$^n$ of the side plate 81$^b$ of the head when the head is moved downwardly, with the result that the blade 155 is moved downwardly about its pivot and shears off the supply portion 27$^b$ of the strap which overlies the cutting blade 154, as shown in Figs. 1 and 12.

Inasmuch as the shearing blade 155 occupies a position directly beneath the head 80 during the shearing operation, it is necessary to effect a lateral movement of both shearing blades in order to get them out of the way of the head 80 as the head moves from the position shown in Figs. 7 and 12 to the position shown in Figs. 1, 9 and 14 and, for this purpose, the lever 156 which carries the shearing blades is automatically rocked about its pivot 157 by the movement of the head. For this purpose, the upwardly extending arm 156$^c$ of the lever is provided with a forwardly extending boss 156$^d$ in which there is secured a pin 165 adapted to travel between cam-shaped guide flanges 81$^o$ which are formed on the rear faces of the side plates 81$^a$ and 81$^b$ of the head, as shown in Figs. 1 and 4. The cam flanges have upper and lower extremities which extend vertically parallel to each other and these vertical portions are connected by parallel inclined portions 81$^p$. During the initial portion of the downward movement of the head 80, the pin 165 travels in the slot between the lower vertical portions of the cam flanges 81$^o$, but after this downward movement of the head has proceeded to the point where the blade 155 has been moved downwardly to a sufficient extent to shear the portion 27$^b$ of the strap, the pin 165 engages the inclined portions 81$^p$ of the cam flanges and this causes the lever 156 to be rocked about its horizontal pivot, with the result that both of the blades 154 and 155 are moved toward the left, as viewed in Fig. 1, so that they are carried out of the path of movement of the head which may then continue its downward movement until the seal positioned between the jaws is seated upon the strap ends, the upper sheared extremity of the strap which has just been cut off by the blades being moved downwardly by the seal until it lies upon the lower extremity 27$^a$ of the strap. When this operation has been completed, the parts will occupy the relative position shown in Figs. 9 and 19 with the shearing blades located at one side of the side plate 81$^b$. During the final downward movement of the head, after the shearing blades have been moved laterally to the position shown in Figs. 9 and 19, the pin 165 travels between the upper parallel portions of the cam flanges 81$^o$.

Upon the reverse movement of the lever 120 and the consequent upward movement of the head 80, the reverse operations are effected with respect to the lever 156 which carries the shearing blades and, as the blade 155 is carried back to a position beneath the elevated sealing head, it is automatically elevated to the position shown in Fig. 12 through the operation of a link 166 which is provided at its lower end with a slot 166$^a$ adapted to engage a headed pin or projection 155$^e$ formed on the end of the blade 155. The head of this projection extends transversely to the length of the link 166 and, in the process of assembly, the link may be applied to the projection 155$^e$ by passing the head of the projection through the slot 166$^a$ and then the link may be turned upwardly to the position shown in Figs. 1, 10 and 19, in which position the upper part of the link is secured to the side plate 81$^b$ of the head by means of a stud 167 which engages an elongated slot 166$^b$ formed in the link. During the downward movement of the head 80, the lower slot 166$^a$ allows the side plate 81$^b$ to move downwardly to a sufficient extent to engage the projection 155$^c$ on the upper shearing blade to cause the shearing movement of that blade and, upon further downward movement of the head, the stud 167 rides downwardly in the slot 166$^b$ as the blades are swung laterally to the position shown in Figs. 9 and 19. Upon the subsequent upward movement of the head, the stud 167 moves upwardly to the upper end of the slot 166$^b$ and the projection 155$^e$ is engaged by the lower end of the slot 166$^a$ so that the further upward movement of the head elevates the blade 155 to the upper position shown in Fig. 12. In this way, the shearing mechanism is automatically actuated to cut off the supply portion of the strap in such a position that the cut edge of the strap will lie in close proximity to the end of the seal which is applied to the overlapping strap ends by the sealing jaws.

Although the operation of the improved strap stretching and sealing apparatus is believed to be clear from the foregoing description, a general summary of the principal features of operation will now be given. Having filled the magazine 65 with a stack of seals 60, the apparatus is placed in position, with the base plate resting on the upper surface or against a vertical surface of the package to be strapped. The free end 27$^a$ of a strap is then placed beneath the gripping dog 30 which is elevated by pressing on the lever 30$^d$. This end of the strap is located, as shown in Fig. 1, so that it extends beneath the shearing blade 154 and over the flange 25$^b$ of the base plate, the retaining member 55 being then elevated to permit the convenient insertion of the strap by the previous movement of the lever 45 to the extreme right-hand position shown in Fig. 1. The strap 27 is then passed around the package 26 and the supply portion 27$^b$ thereof is inserted beneath the gripping dog 35, the retaining member 55 and the gripping dog 47, all of which will have been elevated by the movement of the lever 45 to its extreme right-hand position. This supply portion of the strap is also extended through the slot 30$^c$ in the gripping dog 30. Then upon the initial movement of the lever 45 toward the left, as viewed in Fig. 1, the supply portion 27$^b$ of the strap is automatically gripped by both of the gripping dogs 35 and 47, and the retaining member 55 is moved downwardly to retain both ends of the strap in overlapping alignment with respect to each other. The movement of the lever 45 toward the left is then continued to draw the strap taut around the package. If one movement of the lever is not sufficient, it may be returned toward its initial position and reciprocated several times in order to bring about the desired degree of tautness in the strap. Upon each return movement of the lever 45 toward the right, as viewed in Fig. 1, the gripping dog 35 will automatically elevate sufficiently to slide over the surface of the strap but the gripping dog 47 will retain its hold upon the supply portion of the strap so that there will be no loss of tension while the lever 45 and the gripping dog 35 are making a return stroke. The strap will ordinarily have sufficient stiffness so that on each stretching operation of the lever 45, a portion of the strap will be pushed along beneath the gripping dog 47 due to the inclination of this gripping dog.

Having drawn the strap taut around the package, the lever 120 is then operated to cut off the supply portion of the strap and to apply a seal to the overlapping strap ends. Assuming that the lever 120 is in the extreme right-hand position shown in Fig. 1, a seal 60 will have been fed to a position between the jaws 85 by the plunger 135 which is actuated by the lever 136 and the spring 145 when the head 80 reaches its extreme upper position as shown in Fig. 7 and thereby causes the link 148 to release the latch 142 from the detent 143. The lever 120 is then swung toward the left, from the position shown in Fig. 1, with the result that this lever and the tilting frame 107 move together about the hollow pin 111 carried on the supporting member 110. This movement of the lever 120 and of the tilting frame 107 in unison is due to the fact that, at this stage of the operation, the locking pin 130 is in engagement with the socket member 131 carried by the lever arm. As this swinging movement of the lever 120 and the frame 107 continues, the head 80, carrying a seal between its jaws, moves downwardly to cause the blade 155 to be actuated by the side plate 81$^b$ of the head, thus cutting off the upper portion 27$^b$ of the strap from the source of supply. As this motion of the head continues, the cam flanges 81$^1$ actuate the lever 156 to move the shearing blades 154 and 155 laterally out of the path of movement of the head 80 and the head then continues downwardly until the seal is placed upon the overlapping strap ends, as shown in Figs. 9 and 13. During this downward movement of the head, the link 148 also operates to restore the seal feeding plunger to its initial position shown in Fig. 9 and to restore the latch member 142 into engagement with the detent 143, thus putting the spring 145 under tension in readiness for a succeeding seal feeding operation.

When this stage of the operation is reached, the head 130$^c$ of the locking pin 130 engages the stationary cam 133 and causes the lever 120 to be freed by the pin 130 so that the lever may then pivot about the axis of the shaft 105 without causing further downward movement of the head 80. At the same time that the pin 130 is actuated by the cam 133, the lever 120 reaches such a position with respect to the locking plate 121 that the pin 124 moves outwardly to establish a driving connection between the lever 120 and the shaft 105, this driving connection being provided primarily for use in the subsequent separation of the jaws 85 after the sealing operation has been performed. In addition to the driving connection just mentioned, there is simultaneously established the driving connection between the lever 120 and the shaft 105 which is provided by the teeth or splines 105$^e$ on the shaft and the inwardly projecting keys 120$^c$ formed on the hub of the lever, this connection being employed for applying power to the shaft through the lever for closing the jaws 85 upon each other and causing them to bend the side walls of the seal 60 about the overlapping strap ends and then to shear the lateral edges of the strap and seal to provide an interlocking joint. The movement of the lever 120 to close the jaws 85 upon each other is limited by the engagement of the boss 120$^g$ of the lever with the shoulder 81$^j$ formed on the side plate 81$^b$ of the head.

After forming the joint, the lever 120 is swung toward the right from the position illustrated by dotted lines in Fig. 19, and during the initial portion of this movement, the above mentioned driving connection between the lever and the shaft 105, which is provided by the pin 124 engaging the locking plate 121, causes the shaft 105 to be rotated to separate the jaws 85 through the action of the pinion 105$^a$ and the rack bar 84$^c$, an action which is facilitated by the springs 100, as previously mentioned. As this swinging movement of the lever continues, the jaws 85 reach their final stage of separation and the boss 120$^f$ on the lever engages the lug 107$^c$ on the tilting frame 107 so that the tilting frame is then swung upwardly to elevate the head 80 to its initial upper position shown in Fig. 7. At the same time that the boss 120$^f$ engages the lug 107$^c$ to cause a swinging of the supporting member 110 toward the right, as viewed in Fig. 1, the tapered head 130$^c$ of the locking pin 130 moves out of the recess 25ᵃ in the frame and the other end of the pin moves into engagement with the socket member 131 carried by the lever, thus establishing a driving connection between the lever and the tilting frame 107 in readiness for the succeeding movement of the lever toward the left. As the lever 120 reaches its extreme right-hand position, shown in Fig. 1, the link 148 is again operated to cause another seal to be fed to a position between the sealing jaws. Also during the final movement of the lever 120 toward the right, as viewed in Fig. 1, the lever 156 is actuated to restore the shearing blades 154 and 155 to the operative position shown in Fig. 1.

In Figs. 25 to 32, inclusive, there is shown a modification of the means for mounting and actuating the movable gripping dog 35, heretofore described, which is intended to permit a more ready release of the strap from the tool in case it be desired to do this without completing the formation of the interlocking joint, as, for example, when it is found after drawing the strap taut that it is not in the desired position on the package. Under such circumstances, the tension in the strap tends to hold the gripping dogs 35 and 47 down in their gripping positions and it is difficult to elevate them to release the strap. Means have therefore been provided for facilitating this release. In the drawings of this modification, the same reference numerals are used as were used heretofore to designate the parts which are the same in construction and the present description will be confined to the parts which are different.

In the modified form, the gripping dog 175, which corresponds in position and general function to the gripping dog 35 heretofore described, is provided with a serrated gripping surface 175ᵃ adapted to engage the supply portion 27ᵇ of the strap above the flange 28ᵃ of the movable block 28 and this gripping dog is mounted upon the eccentric portion 176ᵃ of a pin 176 which is in all respects similar to the pin 36 heretofore described except for this eccentric portion and some other details of the forward end thereof. The dog 175 is provided with an upwardly extending arm 175ᵇ and a coil spring 177 is mounted around the eccentric portion 176ᵃ of the pin with one end 177ᵃ thereof engaging one side of the arm 175ᵇ and with the other end 177ᵇ thereof hooked over a part 228ᵃ of the block 28 so that the spring tends normally to move the gripping dog into engagement with the strap. The part 228ᵃ is a portion of a rectangular hollow bracket which extends forwardly from the block 28 and within which the gripping dog 175 is located. The forward end of the pin 176 is provided with an axially concentric cylindrical portion 176ᵇ which is journaled in a bushing mounted in the front transverse member 228ᵇ of this bracket, and, between the parts 176ᵃ and 176ᵇ, the pin is provided with a portion 176ᶜ of hexagonal cross section which fits within a corresponding aperture in the hub portion of a lever 178 arranged to extend upwardly adjacent the arm 175ᵇ of the gripping dog. The lever 178 has a latch member 179 pivoted upon the upper end thereof and this latch member has a flange 179ᵃ extending substantially parallel to the flange 178ᵃ which projects laterally from the upper end of the lever. A coil spring 180 is mounted between the flanges 178ᵃ and 179ᵃ so that the hook portion 179ᵇ of the latch member is normally held in interlocking engagement with the upper extremity of the arm 175ᵇ formed on the adjacent gripping dog. The arm 175ᵇ has an inclined face 175ᶜ adjacent its upper end so that when the lever 178 is moved toward the left from the position shown in Fig. 28, the latch member will automatically interlock with the arm of the detent in the manner shown in Fig. 25.

Assuming that the strap 27 is drawn taut around the package and that the supply end 27ᵇ of the strap is being held by the gripping dog 47, as shown in Fig. 25, it is first necessary to release the strap from this gripping dog and this is effected by first transferring the tension of the strap to the other gripping dog 175 and then finally releasing the latter dog from the strap. To do this the lever 45 is moved from the position shown in Fig. 25 to the position shown by full lines in Fig. 27, thus permitting the dog 175, which is then latched to the lever 178, to move into engagement with the strap under the influence of the spring 177. Then upon further movement of the lever 45 in the same direction to the position shown by dotted lines in Fig. 27, the tension in the strap is taken by the dog 175 and the pin 50 which controls the dog 47 is still engaged by the pin 51, so that the endwise thrust on the portion of the strap between the dog 175 and the dog 47, coupled with the action of the spring 49 associated with the dog 47, operates to raise the dog 47 out of engagement with the strap. The operator then presses on the flange 179ᵃ of the latch member to release the lever 178 from the arm 175ᵇ of the dog 175, whereupon continued downward pressure on the flange 179ᵃ operates the lever 178 to rotate the pin 176 and thereby cause the eccentric portion 176ᵃ to raise the dog 175 out of engagement with the strap. To limit and adjust the movement of the dog 175 toward the flange 28ᵃ of the block, a stud 181 is adjustably mounted in the part 228ᵃ of the block to engage the lower end face of the dog, as shown in Fig. 27, and this stud may be held in adjusted position by a lock nut 182.

The strap stretching or tensioning apparatus described above is claimed in applicants' copending divisional application Serial No. 503,264, filed September 21, 1943.

Although one form of the invention and a modification thereof have been shown and described by way of illustration, it will be understood that it may be constructed in various other embodiments coming within the scope of the appended claims.

We claim:

1. The combination in strap stretching and sealing apparatus, of a base plate adapted to rest on a package, means carried by the base plate for holding a strap with its ends overlapping, means including a pivoted lever for actuating said holding means, a seal magazine mounted on said base plate and extending upwardly therefrom, a sealing head mounted to slide on said magazine and to receive seals therefrom, means to feed seals from said magazine to said sealing head, and means including a lever for actuating said head.

2. The combination in strap sealing apparatus, of a base plate adapted to rest on a package, means carried by said base plate for holding a strap with its ends overlapping, a seal magazine mounted on said base plate, a sealing head movable toward and from said strap ends adjacent said magazine, seal feeding means for feeding seals from said magazine to a position wherein they are held by said sealing head, a spring for actuating said seal feeding means, means controlled by the movements of said sealing head for putting said spring under tension and controlling the seal feeding operations thereof, and means for moving said head.

3. The combination in strap sealing apparatus, of a base plate adapted to rest on a package, means carried by said base plate for holding a strap with its ends overlapping, a seal magazine mounted on said base plate, a sealing head movable toward and from said strap ends adjacent said magazine, said head comprising sealing jaws adapted to receive a seal between them from said magazine and to apply said seal to the overlapping strap ends when the sealing head is lowered, seal feeding mechanism moving the seals from said magazine to said sealing head when said head is elevated from said strap ends, a spring for actuating said seal feeding means, means actuated when said head is lowered for putting said spring under tension, means including a latch member for holding said spring under tension, means actuated when said head is elevated for releasing said latch member to permit the operation of said seal feeding means by said spring, and means for moving said head.

4. The combination in strap sealing apparatus, of a base plate adapted to rest on a package, means carried by said base plate for holding a strap with its ends overlapping, a seal magazine mounted on said base plate, a sealing head movable toward and from said strap ends adjacent said magazine, said head comprising relatively movable jaws adapted to receive between them seals from said magazine, a plunger for feeding seals from said magazine to said jaws when said head is elevated from said strap ends, a spring for causing a feeding movement of said plunger, means including a link actuated by said head for retracting said plunger upon the downward movement of said head and for simultaneously putting said spring under tension, a latch member for holding said spring under tension and for holding said plunger in its retracted position, a detent adapted to be engaged by said latch member, means including said link arranged when said head is elevated to release said latch member from said detent and thereby permit said spring to cause a feeding movement of said plunger, and means for moving said head toward and from said strap ends.

5. The combination in strap sealing apparatus, of means for holding a strap with its ends overlapping, a sealing head mounted for movement toward and from said strap ends, said head comprising relatively movable jaws, a movable member connected to said head, an operating lever, means for locking said lever with respect to said movable member to effect movement of said head upon movement of said lever, means including a rotatable movable member for actuating said jaws, and means for releasing said lever from said movable member and forming a driving connection between said rotatable member and said lever.

6. The combination in strap sealing apparatus, of means for holding a strap with its ends overlapping, a sealing head mounted for movement toward and from said strap ends, a tilting frame pivotally connected to said head, a pivotally mounted supporting member having a pivotal connection with said tilting frame, and means for effecting movement of said head.

7. The combination in strap sealing apparatus, of means for holding a strap with its ends overlapping, a sealing head mounted for movement toward and from said strap ends, a tilting frame pivotally connected to said head, a pivotally mounted supporting member having a pivotal connection with said tilting frame, an operating lever, and means for locking said lever to said tilting frame to effect movement of said head.

8. The combination in strap sealing apparatus, of means for holding a strap with its ends overlapping, a sealing head adapted to move toward and from said strap ends, means including a tilting frame pivotally connected to said head for supporting said head, a pivotally mounted operating lever, means including a locking pin for forming a driving connection between said lever and said tilting frame, and means including a stationary cam for disengaging said pin from said lever when said head reaches a predetermined position.

9. The combination in strap sealing apparatus, of a base plate adapted to rest on a package, means carried by said base plate for holding a strap with its ends overlapping, a sealing head adapted to move toward and from said strap ends, said head comprising relatively movable jaws, a shaft carried by said head, a tilting frame pivotally engaging said shaft to support said head, means for actuating said jaws by the rotation of said shaft, an operating lever mounted on said shaft, means for locking said lever to said tilting frame to permit movement bodily of said head, and means for forming a driving connection between said lever and said shaft to permit the operation of said jaws by said lever.

10. The combination in strap sealing apparatus, of a base plate adapted to rest on a package, means carried by said base plate for holding a strap with its ends overlapping, a sealing head adapted to move toward and from said strap ends, said head comprising relatively movable jaws, a shaft carried by said head, a tilting frame pivotally engaging said shaft to support said head, means for actuating said jaws by the rotation of said shaft, an operating lever mounted on said shaft, means for locking said lever to said tilting frame to permit movement bodily of said head, means for actuating said locking means to release said lever from said frame when said jaws have reached a position embracing said strap ends, and means operative when said locking means is released for establishing a driving connection between said lever and said shaft for permitting actuation of said jaws by said lever.

11. The combination in strap sealing apparatus, of means for holding a strap with its ends overlapping, a sealing head adapted to move toward and from said strap ends, said head comprising relatively movable jaws, a shaft carried by said head, a tilting frame pivotally engaging said shaft to support said head, means for actuating said jaws by the rotation of said shaft, an operating lever mounted on said shaft, means for locking said lever to said tilting frame to permit movement bodily of said head, means for actuating said locking means to release said lever from said frame when said jaws have reached a position embracing said strap ends, and means actuated when said lever is released by said locking means for establishing one driving connection between said lever and said shaft for permitting the closing of said jaws by said lever and for establishing another driving connection between said lever and said shaft for allowing the separation of said jaws by said lever.

12. The combination in strap sealing apparatus, of means for holding a strap with its ends overlapping, a sealing head adapted to move toward and from said strap ends, said head comprising relatively movable jaws, a shaft carried by said head, a tilting frame pivotally engaging said shaft to support said head, means for actuating said jaws by the rotation of said shaft, an operating lever mounted on said shaft, means for locking said lever to said tilting frame to permit movement bodily of said head, means for actuating said locking means to release said lever from said frame when said jaws have reached a position embracing said strap ends, means actuated when said lever is released by said locking means for establishing one driving connection between said lever and said shaft for permitting the closing of said jaws by said lever and for establishing another driving connection between said lever and said shaft for allowing the separation of said jaws by said lever, and means effective after said jaws have been separated for forming another connection between said lever and said tilting frame to allow said head to be elevated by the movement of said lever.

13. The combination in strap sealing apparatus, of a base plate adapted to rest on a package, means carried by said base plate for holding a strap with its ends overlapping, a seal magazine mounted on said base plate and extending upwardly therefrom, a sealing head comprising side plates having a pair of sealing jaws pivotally mounted between them, one of said side plates being slidably mounted on said magazine, a tilting member pivotally connected to said head for raising and lowering said head with respect to said strap ends, a pivoted lever, and means for causing said lever to move with said tilting member for effecting movement bodily of said head and for permitting relative angular movement of said lever with respect to said tilting member for causing the actuation of said jaws.

14. The combination in strap sealing apparatus, of a base plate adapted to rest on a package, means caried by said base plate for holding a strap with its ends overlapping, a seal magazine mounted on said base plate and extending upwardly therefrom, a sealing head slidably mounted on said magazine for movement toward and from said strap ends, said head including a pair of relatively movable jaws adapted to receive between them a seal from said magazine when said head is elevated, a supporting member pivoted on said base plate, a tilting frame pivoted on said supporting member, a shaft forming a pivotal connection between said tilting frame and said head, means connected with said shaft for effecting relative movement of said jaws, a lever mounted to swing about the axis of said shaft, and means for forming a driving connection between said lever and said shaft.

15. The combination in strap sealing apparatus, of a base plate adapted to rest on a package, means carried by said base plate for holding a strap with its ends overlapping, a seal magazine mounted on said base plate and extending upwardly therefrom, a sealing head slidably mounted on said magazine for movement toward and from said strap ends, said head including a pair of relatively movable jaws adapted to receive between them a seal from said magazine when said head is elevated, a supporting member pivoted on said base plate, a tilting frame pivoted on said supporting member, a shaft forming a pivotal connection between said tilting frame and said head, means connected with said shaft for effecting relative movement of said jaws, a lever mounted to swing about the axis of said shaft, and means for locking said lever to said tilting frame to permit movement of said head toward said strap ends.

16. The combination in strap sealing apparatus, of a base plate adapted to rest on a package, means carried by said base plate for holding a strap with its ends overlapping, a seal magazine mounted on said base plate and extending upwardly therefrom, a sealing head slidably mounted on said magazine for movement toward and from said strap ends, said head including a pair of relatively movable jaws adapted to receive between them a seal from said magazine when said head is elevated, a supporting member pivoted on said base plate, a tilting frame pivoted on said supporting member, a shaft forming a pivotal connection between said tilting frame and said head, means connected with said shaft for effecting relative movement of said jaws, a lever mounted to swing about the axis of said shaft, means for locking said lever to said tilting frame to permit movement of said head toward said strap ends, means actuated when said head is in a predetermined position for actuating said locking means to release said lever, and means for then establishing a driving connection between said lever and said shaft to permit the closing of said jaws by the rotation of said shaft.

17. The combination in strap sealing apparatus, of a base plate adapted to rest on a package, means carried by said base plate for holding a strap with its ends overlapping, a seal magazine mounted on said base plate and extending upwardly therefrom, a sealing head slidably mounted on said magazine for movement toward and from said strap ends, said head including a pair of relatively movable jaws adapted to receive between them a seal from said magazine when said head is elevated, a supporting member pivoted on said base plate, a tilting frame pivoted on said supporting member, a shaft forming a pivotal connection between said tilting frame and said head, means connected with said shaft for effecting relative movement of said jaws, a lever mounted to swing about the axis of said shaft, means for locking said lever to said tilting frame to permit movement of said head toward said strap ends, means actuated when said head is in a predetermined position for actuating said locking means to release said lever, means for then establishing a driving connection between said lever and said shaft to permit the closing of said jaws by the rotation of said shaft, means actuated when said driving connection is established for forming an independent driving connection between said lever and said shaft to permit the subsequent opening of said jaws by said lever, and means effective when said jaws have been opened by the pivotal movement of said member for establishing another driving connection between said lever and said tilting frame to permit said head to be elevated by the movement of said member.

18. The combination in strap sealing apparatus, of a base plate adapted to rest on a package, means carried by said base plate for holding a strap with its ends overlapping, a seal magazine mounted on said base plate and extending upwardly therefrom, a sealing head slidably mounted on said magazine for movement toward and from said strap ends, said head including a pair of relatively movable jaws adapted to receive between them a seal from said magazine when said head is elevated, a supporting member pivoted on said base plate, a tilting frame pivoted on said supporting member, a shaft forming a pivotal connection between said tilting frame and said head, means connected with said shaft for effecting relative movement of said jaws, a lever mounted to swing about the axis of said shaft, means for locking said lever to said tilting frame to permit movement of said head toward said strap ends, means actuated when said head is in a predetermined position for actuating said locking means to release said lever, means for then establishing a driving connection between said lever and said shaft to permit the closing of said jaws by the rotation of said shaft, means actuated when said driving connection is established for forming an independent driving connection between said lever and said shaft to permit the subsequent opening of said jaws by said member, means effective when said jaws have been opened by the pivotal movement of said member for establishing another driving connection between said lever and said tilting frame to permit said head to be elevated by the movement of said member, and means operative when said last mentioned driving connection is established for actuating said first named locking means to lock said lever to said tilting frame in readiness for effecting a succeeding downward movement of said head.

19. The combination in strap sealing apparatus, of means for holding a strap passed around a package with its end portions overlapping one above the other, a sealing head mounted for movement toward and from said strap ends and comprising means arranged to hold a seal and to move the seal into engagement with the strap ends, means for effecting movement bodily of said sealing head cutting mechanism located in the path of movement of said head for cutting off one end portion of the strap from a source of supply, means actuated by the movement of said head for operating said cutting mechanism, and additional means associated with said head and operated thereby for then moving said mechanism out of said path.

20. The combination in strap sealing apparatus, of means for holding a strap passed around a package with its end portions overlapping one above the other, a sealing head mounted for movement toward and from said strap ends and comprising relatively movable jaws arranged to hold a seal and to move the seal into engagement with the strap ends, means for effecting movement bodily of said sealing head and for effecting relative movement of said jaws, cutting mechanism located in the path of movement of said head for cutting off the upper end portion of the strap from a source of supply, means actuated by the movement of said head for operating said cutting mechanism, and means mounted adjacent said head and operatively connected therewith for moving said cutting mechanism out of the path of movement of said head after the cutting of the strap has been effected to permit the continued movement of said head to apply a seal held by said jaws to said overlapping strap ends.

21. The combination in strap sealing apparatus, of means for holding a strap passed around a package with its end portions overlapping one above the other, a sealing head mounted for movement toward and from said strap ends and comprising relatively movable jaws arranged to hold a seal and to move the seal into engagement with the strap ends, means for effecting movement bodily of said sealing head and for effecting relative movement of said jaws, a pair of shearing blades mounted normally beneath said head, the upper end portion of said strap being adapted to pass over one of said blades, means actuated when said head is moved downwardly for effecting a downward movement of the other shearing blade to cut off the strap in a line substantially in the same vertical plane with one end of a seal mounted between said jaws, and means actuated in response to movement of said head after the strap has been cut for moving both of said shearing blades bodily out of the path of movement of said head.

22. The combination in strap sealing apparatus, of means for holding a strap passed around a package with its end portions overlapping one above the other, a sealing head mounted for movement toward and from said strap ends and comprising relatively movable jaws arranged to hold a seal and to move the seal into engagement with the strap ends, means for effecting movement bodily of said sealing head and for effecting relative movement of said jaws, a pair of shearing blades mounted normally beneath said head, the upper end portion of said strap being adapted to pass over one of said blades, means actuated when said head is moved downwardly for effecting a downward movement of the other shearing blade to cut off the strap in a line substantially in the same vertical plane with one end of a seal mounted between said jaws, a lever on which both of said shearing blades are mounted, and cam means carried by said head and operative when said strap has been cut for actuating said lever to swing said shearing blades out of the path of movement of said head.

23. A strap sealing apparatus comprising, a sealing device having parts adapted to embrace and deform the overlapping strap ends and a contacting seal to provide an interlocking joint, means for feeding a seal into a position to be operated upon by the sealing device, movably mounted cutting mechanism for cutting off the supply end of the strap adjacent the location of the joint, means associated with the sealing device for operating the cutting mechanism, and means associated with the sealing device and the cutting mechanism and actuated when the sealing device is operated for moving the cutting mechanism away from its cutting position, said last-mentioned means including a cam.

24. Apparatus for fastening together the ends of a binding strap and a clip seal comprising means for tightening the strap and for holding the strap ends in superposed relationship, sealing mechanism including bending jaws for forming the joint between the strap ends and the clip seal, feeding apparatus for feeding a clip seal over the superposed strap ends and adjacent the sealing mechanism, a movably mounted shear including a shear block and an upper shear member for severing the upper strap adjacent the point of sealing, and means for actuating the shear, said movably mounted shear being automatically cammed out of cutting position adjacent the point of sealing upon actuation of the sealing mechanism.

25. The combination in strap sealing apparatus of a base plate adapted to rest upon a package, means carried by said base plate for holding a strap with its ends overlapping, a seal magazine extending upwardly from said base plate and adapted to contain a stack of superimposed seals, a sealing head movable toward and from said strap ends adjacent said magazine, seal feeding means for feeding the lowermost seal of said stack from said magazine to a position wherein it is carried by said sealing head, a spring for actuating said seal feeding means, and means comprising parts mounted adjacent said head and said magazine and operatively associated therewith and actuated by the movement of said head for storing energy in said spring and then releasing said spring to effect the feeding of a seal to said position in said head.

26. The combination in strap sealing apparatus, of a base plate adapted to rest upon a package, means carried by said base plate for holding a strap with its ends overlapping, a seal magazine extending upwardly from said base plate and adapted to contain a stack of superimposed seals, a sealing head movable toward and from said strap ends adjacent said magazine, seal feeding means for feeding the lowermost seal of said stack from said magazine to a position wherein it is carried by said sealing head, a spring for actuating said seal feeding means, and means comprising parts mounted adjacent said head and said magazine and operatively associated therewith and actuated by the movement of said head in one direction to store energy in said spring and operated upon movement of said head in the opposite direction to release said spring and effect the feeding of a seal from said magazine.

27. The combination in strap sealing apparatus, of a base plate adapted to rest on a package, means carried by said base plate for holding a strap with its ends overlapping, a seal magazine mounted on said base plate, a sealing head movable toward and from said strap ends adjacent said magazine, said head comprising sealing jaws adapted to receive a seal between them from said magazine and to apply said seal to the overlapping strap ends when the sealing head is lowered, a feeding plunger for moving a seal from said magazine to said sealing head when said head is elevated from said strap ends, means including a spring for actuating said plunger to feed a seal, means actuated by the movement of said head for storing energy in said spring to actuate said plunger, means including a latch for restraining said spring and said seal feeding means, and means for releasing said latch when said head reaches a predetermined position.

28. The combination in strap sealing apparatus, of means for holding a strap with its ends overlapping, a sealing head adapted to move toward and from said strap ends, means including a tilting frame for supporting said head, an operating lever, a pin mounted for movement with said head and arranged to control the operation of said lever, means for forming a driving connection including said pin for effecting bodily movement of said head by movement of said lever, and means including a stationary cam adapted to be engaged by said pin to control said driving connection.

29. The combination in strap sealing apparatus, of a base plate adapted to rest on a package, means carried by said base plate for holding a strap with its ends overlapping, a seal magazine mounted on and extending upwardly from said base plate, a sealing head mounted to slide on said magazine and comprising sealing jaws adapted to receive seals from said magazine, means for feeding seals from said magazine to a position between the jaws of said head, a lever mounted to swing in a plane parallel to the strap ends, means actuated by said lever and operatively connected with said jaws and said head for causing the movement of said lever to effect movement bodily of said head and the relative movement of said jaws, and means operatively connected to said seal feeding means and actuated by the movement of said head for effecting the actuation of said feeding means.

30. The combination in strap sealing apparatus, of a base plate adapted to rest on a package, a seal magazine mounted on and extending upwardly from said base plate, a sealing head movable adjacent said seal magazine, spring-actuated means for feeding seals from said magazine to a position wherein they were carried by said sealing head, means for moving said head, and means operatively connected with said spring-actuated feeding means and arranged to be actuated by said head upon movement thereof for controlling the operation of said feeding means in response to the movement of said head.

31. The combination in strap sealing apparatus, of a base plate adapted to rest on a package, means crried by said base plate for holding a strap with its ends overlapping, a seal magazine mounted on said base plate, a sealing head movable toward and from the strap ends, spring-actuated means for feeding seals from said magazine to a position wherein they are carried by said sealing head, operating mechanism including a pivoted lever mounted to swing in a vertical plane parallel to the strap ends, operating connections from said mechanism to said head for moving said head upon movement of said lever, and means connected to said seal feeding mechanism and including a part positioned to be actuated by said head for actuating said seal feeding mechanism in response to the movement of said head.

WILLIAM C. CHILDRESS.
JAMES M. ROYAL.